US011106787B2

(12) United States Patent
Hakuta et al.

(10) Patent No.: US 11,106,787 B2
(45) Date of Patent: Aug. 31, 2021

(54) INFORMATION PROCESSING DEVICE AND INFORMATION PROCESSING METHOD

(71) Applicant: CLARION CO., LTD., Saitama (JP)

(72) Inventors: Keisuke Hakuta, Tokyo (JP); Eriko Ando, Tokyo (JP); Makoto Kayashima, Tokyo (JP); Nobuyoshi Morita, Tokyo (JP)

(73) Assignee: CLARION CO., LTD., Saitama (JP)

( * ) Notice: Subject to any disclaimer, the term of this patent is extended or adjusted under 35 U.S.C. 154(b) by 56 days.

(21) Appl. No.: 15/568,675

(22) PCT Filed: Dec. 10, 2015

(86) PCT No.: PCT/JP2015/084684
§ 371 (c)(1),
(2) Date: Oct. 23, 2017

(87) PCT Pub. No.: WO2016/170709
PCT Pub. Date: Oct. 27, 2016

(65) Prior Publication Data
US 2018/0144128 A1    May 24, 2018

(30) Foreign Application Priority Data
Apr. 24, 2015 (JP) .............................. JP2015-089717

(51) Int. Cl.
*H04L 29/06* (2006.01)
*G06F 21/55* (2013.01)
(Continued)

(52) U.S. Cl.
CPC .............. *G06F 21/554* (2013.01); *G06F 9/54* (2013.01); *G06F 9/542* (2013.01); *G06F 21/55* (2013.01);
(Continued)

(58) Field of Classification Search
CPC ...... G06F 21/554; G06F 9/542; G06F 21/604; G06F 9/54; G06F 21/55; H04L 63/20; H04L 63/145; H04L 63/08; H04L 67/12
See application file for complete search history.

(56) References Cited

U.S. PATENT DOCUMENTS

| | | | |
|---|---|---|---|
| 5,935,248 A | 8/1999 | Kuroda | |
| 6,553,308 B1 * | 4/2003 | Uhlmann | ................ B61L 29/24 340/988 |

(Continued)

FOREIGN PATENT DOCUMENTS

| | | |
|---|---|---|
| CN | 103679022 A | 3/2014 |
| JP | 07-295936 A | 11/1995 |

(Continued)

OTHER PUBLICATIONS

International Search Report for WO 2016/170709 A1, dated Mar. 15, 2016.

(Continued)

*Primary Examiner* — Carl G Colin
*Assistant Examiner* — Hany S. Gadalla
(74) *Attorney, Agent, or Firm* — Volpe Koenig

(57) ABSTRACT

An information processing device including a security function related to information security and an information processing function related to predetermined information processing, includes: a control unit which performs control processing for realizing the security function and the information processing function; and a storage unit which stores information related to the security function and the information processing function, wherein: when the control unit detects an occurrence of a predetermined event related to the security function or the information processing function, the control unit determines an operation content of the security function based on the information stored in the storage unit.

13 Claims, 19 Drawing Sheets

(51) Int. Cl.
G06F 9/54 (2006.01)
G06F 21/60 (2013.01)
H04L 29/08 (2006.01)

(52) U.S. Cl.
CPC ............ G06F 21/604 (2013.01); H04L 63/08 (2013.01); H04L 63/145 (2013.01); H04L 63/20 (2013.01); H04L 67/12 (2013.01)

(56) References Cited

U.S. PATENT DOCUMENTS

| | | | | |
|---|---|---|---|---|
| 7,712,135 | B2* | 5/2010 | Steinberg | G06F 21/565 726/24 |
| 8,402,268 | B2* | 3/2013 | Dierickx | B60R 25/04 713/164 |
| 8,843,303 | B1* | 9/2014 | Young | G08G 5/0039 701/122 |
| 8,955,130 | B1* | 2/2015 | Kalintsev | G06F 21/567 701/415 |
| 9,591,480 | B2* | 3/2017 | Aijaz | H04W 12/06 |
| 2006/0049921 | A1* | 3/2006 | Hara | B60R 25/00 340/426.1 |
| 2006/0049925 | A1* | 3/2006 | Hara | B60R 25/04 340/435 |
| 2007/0126560 | A1* | 6/2007 | Seymour | B60R 25/241 340/426.1 |
| 2008/0235473 | A1* | 9/2008 | Hofmann | G05B 19/0425 711/163 |
| 2009/0243872 | A1 | 10/2009 | Takahashi | |
| 2010/0318794 | A1* | 12/2010 | Dierickx | H04L 63/0861 713/164 |
| 2011/0083161 | A1* | 4/2011 | Ishida | H04L 63/0492 726/2 |
| 2011/0196568 | A1* | 8/2011 | Nickolaou | B60W 30/0953 701/31.4 |
| 2013/0152198 | A1* | 6/2013 | Akiyama | G06F 21/554 726/22 |
| 2013/0227648 | A1 | 8/2013 | Ricci | |
| 2013/0298052 | A1 | 11/2013 | Nara et al. | |
| 2014/0090062 | A1* | 3/2014 | Guo | G06F 21/566 726/24 |
| 2014/0115027 | A1 | 4/2014 | Akaiwa et al. | |
| 2015/0150124 | A1* | 5/2015 | Zhang | H04L 63/1408 726/22 |
| 2015/0271201 | A1* | 9/2015 | Ruvio | H04L 63/1441 726/23 |
| 2016/0012403 | A1* | 1/2016 | Kursun | G06Q 20/1085 705/44 |
| 2016/0132778 | A1 | 5/2016 | Hayashi | |
| 2016/0214535 | A1* | 7/2016 | Penilla | G06Q 20/18 |

FOREIGN PATENT DOCUMENTS

| | | |
|---|---|---|
| JP | 09-116534 A | 5/1997 |
| JP | 11-345118 A | 12/1999 |
| JP | 2007-128234 A | 5/2007 |
| JP | 2008-172701 A | 7/2008 |
| JP | 2009-245139 A | 10/2009 |
| JP | 2010-034651 A | 2/2010 |
| JP | 2011-204235 A | 10/2011 |
| JP | 2012-114699 A | 6/2012 |
| JP | 2015-022378 A | 2/2015 |
| JP | 2015-508927 A | 3/2015 |

OTHER PUBLICATIONS

Japanese Office Action dated Jan. 8, 2019 for the Japanese Patent Application No. 2015-089717.
Extended European Search Report dated Nov. 9, 2018 for the European Patent Application No. 15889948.4.
Communication pursuant to Article 94(3) EPC dated Sep. 12, 2019 for the European Patent Application No. 15889948.4.
Chinese Office Action dated Oct. 9, 2019 for the Chinese Patent Application No. 201580078490.X.
Extended European Search Report dated Nov. 13, 2020 for European Patent Application No. 20194720.7.
Japanese Office Action dated Nov. 24, 2020 for Japanese Patent Application No. 2019-151073.

* cited by examiner

FIG. 5

| SECURITY LEVEL MANAGEMENT INFORMATION 301 | |
|---|---|
| SECURITY FUNCTION | FUNCTIONAL STATE |
| VIRUS DETECTION/ REMOVAL | OFF (INVALID) |
| ACCESS CONTROL | ON (VALID) |
| AUTHENTICATION | ON (VALID) |
| ENCRYPTION | ON (VALID) |
| ... | ... |

SECURITY LEVEL DEFINITIONENT INFORMATION — 302

| SECURITY FUNCTION | SECURITY LEVEL | | |
|---|---|---|---|
| | LEVEL 1 | LEVEL 2 | LEVEL 3 |
| VIRUS DETECTION/ REMOVAL | OFF (INVALID) | OFF (INVALID) | ON (VALID) |
| ACCESS CONTROL | OFF (INVALID) | ON (VALID) | ON (VALID) |
| AUTHENTICATION | OFF (INVALID) | ON (VALID) | ON (VALID) |
| ENCRYPTION | OFF (INVALID) | ON (VALID) | ON (VALID) |
| ... | ... | ... | ... |

FIG. 7

SECURITY LEVEL DEFINITIONENT INFORMATION — 303

| SECURITY LEVEL | STATE OF EACH INTERFACE | | | | |
|---|---|---|---|---|---|
| | Bluetooth | | USB MEMORY | | ... |
| | CONNECTIONS | ... | CONNECTIONS | ... | ... |
| LEVEL 1 | 0 UNITS | ... | 0 | ... | ... |
| LEVEL 2 | 1 UNIT | ... | 1 | ... | ... |
| LEVEL 3 | 2 UNITS OR MORE | ... | 1 | ... | ... |

FIG.8

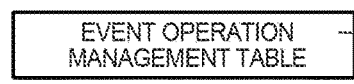
EVENT OPERATION MANAGEMENT TABLE

| EVENT DETECTED BY SECURITY FUNCTION CONTROL UNIT | VIRUS DETECTION/REMOVAL FUNCTION | | |
|---|---|---|---|
| | EVENT TO BE IMPLEMENTED BY INFORMATION PROCESSING FUNCTION CONTROL UNIT | NOTIFIED CONTENT | EVENT TO BE IMPLEMENTED BY SECURITY FUNCTION CONTROL UNIT AFTER RECEPTION OF NOTIFIED CONTENT |
| DETECT CONNECTION OF EXTERNAL DEVICE | INFORMATION PROCESSING LEVEL 1 | | |
| | TURN ON SECURITY FUNCTION OPERATION COMPREHENSION FLAG | PERMIT CHANGE OF SECURITY LEVEL, AND VALIDATION OF VIRUS DETECTION/REMOVAL FUNCTION | VALIDATE VIRUS DETECTION/REMOVAL FUNCTION ACCORDING TO SECURITY LEVEL BASED ON CHANGE OF SECURITY LEVEL AND SECURITY LEVEL DEFINITION INFORMATION |
| | INFORMATION PROCESSING LEVEL 2,3 | | |
| | NONE | RETRY 10 MINUTES LATER ON WHETHER TO PERMIT CHANGE OF SECURITY LEVEL, AND VALIDATION OF VIRUS DETECTION/REMOVAL FUNCTION | SET TIMER, AND WRITE EVENT DETECTED BY SECURITY FUNCTION CONTROL UNIT IN WAITING STATE IDENTIFICATION FLAG |
| DETECT DISCONNECTION OF EXTERNAL DEVICE | INFORMATION PROCESSING LEVEL 1,2,3 | | |
| | TURN OFF SECURITY FUNCTION OPERATION COMPREHENSION FLAG | PERMIT CHANGE OF SECURITY LEVEL, AND INVALIDATION OF VIRUS DETECTION/REMOVAL FUNCTION | INVALIDATE VIRUS DETECTION/REMOVAL FUNCTION ACCORDING TO SECURITY LEVEL BASED ON CHANGE OF SECURITY LEVEL AND SECURITY LEVEL DEFINITION INFORMATION |
| DETECT LAPSE OF PREDETERMINED TIME BASED ON SET TIMER, AND ACQUIRE INFORMATION OF WAITING STATE IDENTIFICATION FLAG | INFORMATION PROCESSING LEVEL 1 | | |
| | TURN ON SECURITY FUNCTION OPERATION COMPREHENSION FLAG | IMPLEMENT NOTIFIED CONTENT CORRESPONDING TO EVENT OF SECURITY FUNCTION CONTROL UNIT WRITTEN INTO WAITING STATE IDENTIFICATION FLAG | IMPLEMENT EVENT OF SECURITY FUNCTION CONTROL UNIT AFTER RECEPTION OF NOTIFIED CONTENT CORRESPONDING TO EVENT OF SECURITY FUNCTION CONTROL UNIT WRITTEN INTO WAITING STATE IDENTIFICATION FLAG |
| | INFORMATION PROCESSING LEVEL 2,3 | | |
| | NONE | RETRY 10 MINUTES LATER ON WHETHER TO PERMIT CHANGE OF SECURITY LEVEL, AND VALIDATION OF VIRUS DETECTION/REMOVAL FUNCTION | SET TIMER, AND WRITE EVENT DETECTED BY SECURITY FUNCTION CONTROL UNIT IN WAITING STATE IDENTIFICATION FLAG |
| DETECT VALIDATION OF VIRUS DETECTION/REMOVAL FUNCTION | INFORMATION PROCESSING LEVEL 1 | | |
| | NONE | PERMIT EXECUTION OF VIRUS SCAN | EXECUTE VIRUS SCAN, AND NOTIFY RESULT TO SECURITY FUNCTION CONTROL UNIT |
| | INFORMATION PROCESSING LEVEL 2,3 | | |
| | NONE | RETRY 10 MINUTES LATER ON WHETHER TO PERMIT EXECUTION OF VIRUS SCAN | SET TIMER, AND WRITE EVENT DETECTED BY SECURITY FUNCTION CONTROL UNIT IN WAITING STATE IDENTIFICATION FLAG |

FIG.9

| | EVENT OPERATION MANAGEMENT TABLE — 304 |

| EVENT DETECTED BY SECURITY FUNCTION CONTROL UNIT | VIRUS DETECTION/REMOVAL FUNCTION ||||
|---|---|---|---|
| | EVENT TO BE IMPLEMENTED BY INFORMATION PROCESSING FUNCTION CONTROL UNIT | NOTIFIED CONTENT | EVENT TO BE IMPLEMENTED BY SECURITY FUNCTION CONTROL UNIT AFTER RECEPTION OF NOTIFIED CONTENT |
| DETECT THAT THERE ARE 1 OR MORE VIRUS SCAN RESULTS | INFORMATION PROCESSING LEVEL 1 |||
| | END PREDETERMINED INFORMATION PROCESSING FUNCTION | PERMIT EXECUTION OF VIRUS REMOVAL | EXECUTE VIRUS REMOVAL, AND NOTIFY RESULT TO SECURITY FUNCTION CONTROL UNIT |
| | INFORMATION PROCESSING LEVEL 2,3 |||
| | NONE | RECONFIRM 10 MINUTES LATER ON WHETHER TO PERMIT EXECUTION OF VIRUS REMOVAL | SET TIMER, AND WRITE EVENT DETECTED BY SECURITY FUNCTION CONTROL UNIT IN WAITING STATE IDENTIFICATION FLAG |
| DETECT THAT THERE ARE 0 VIRUS SCAN RESULTS | INFORMATION PROCESSING LEVEL 1,2,3 |||
| | NONE | NOTIFY RECEPTION OF NOTIFIED CONTENT | NONE |
| VIRUS REMOVAL WAS SUCCESSFUL | INFORMATION PROCESSING LEVEL 1 |||
| | END PREDETERMINED INFORMATION PROCESSING FUNCTION | NOTIFY PERMISSION OF REBOOT | EXECUTE REBOOT |
| | INFORMATION PROCESSING LEVEL 2,3 |||
| | NONE | RECONFIRM 10 MINUTES LATER ON WHETHER TO PERMIT EXECUTION OF REBOOT | SET TIMER, AND WRITE EVENT DETECTED BY SECURITY FUNCTION CONTROL UNIT IN WAITING STATE IDENTIFICATION FLAG |
| VIRUS REMOVAL WAS UNSUCCESSFUL | INFORMATION PROCESSING LEVEL 1 |||
| | NONE | PERMIT EXECUTION OF VIRUS SCAN | EXECUTE VIRUS REMOVAL, AND NOTIFY RESULT TO SECURITY FUNCTION CONTROL UNIT |
| | INFORMATION PROCESSING LEVEL 2,3 |||
| | NONE | RECONFIRM 10 MINUTES LATER ON WHETHER TO PERMIT EXECUTION OF VIRUS REMOVAL | SET TIMER, AND WRITE EVENT DETECTED BY SECURITY FUNCTION CONTROL UNIT IN WAITING STATE IDENTIFICATION FLAG |

FIG. 11

312
INFORMATION PROCESSING
LEVEL DEFINITION INFORMATION

|  | INFORMATION PROCESSING LEVEL | | |
|---|---|---|---|
|  | LEVEL 1 | LEVEL 2 | LEVEL 3 |
| VEHICLE SPEED | ~60km/h | 60~80km/h | 80km/h~ |
| TRAVELING EXPERIENCE TO DESTINATION | YES | NO | NO |
| TRAVELING POSITION | LOCAL STREET | TOLL ROAD | EXPRESSWAY |
| ... | ... | ... | ... |

FIG.12
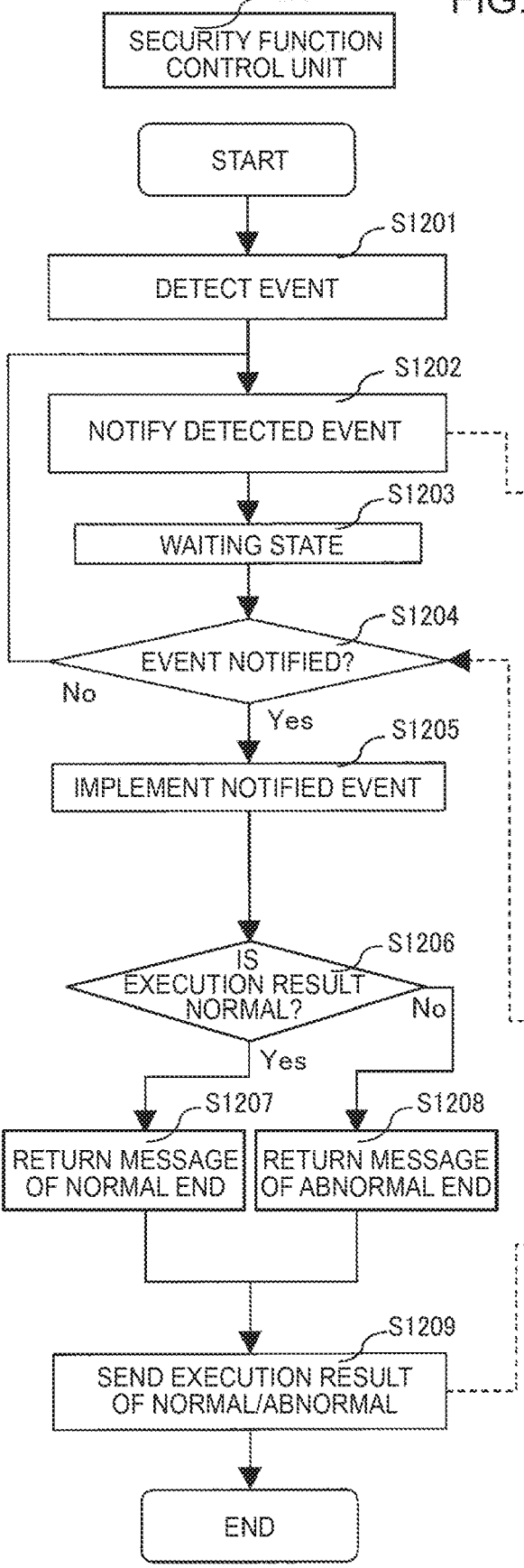
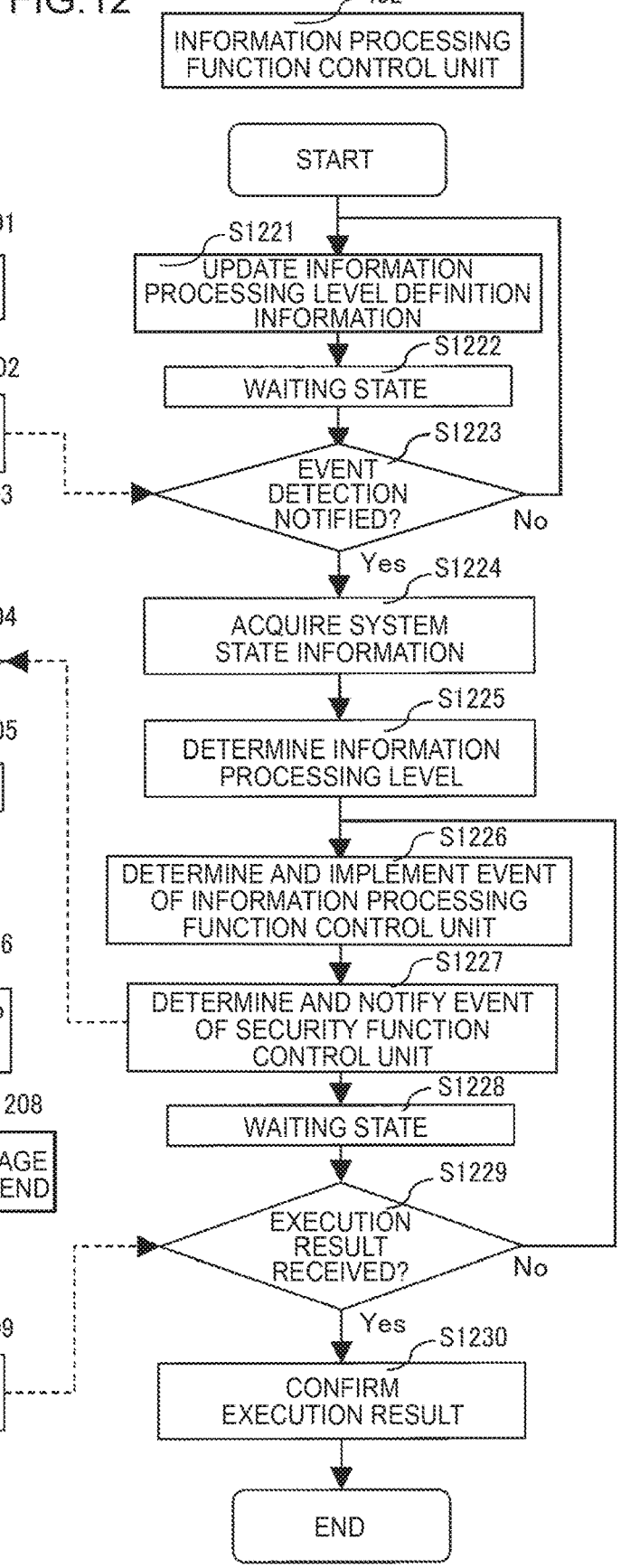

FIG.14

EVENT OPERATION MANAGEMENT TABLE — 304

| VIRUS DETECTION/REMOVAL FUNCTION | | | |
|---|---|---|---|
| EVENT DETECTED BY INFORMATION PROCESSING FUNCTION CONTROL UNIT | EVENT TO BE IMPLEMENTED BY SECURITY FUNCTION CONTROL UNIT | NOTIFIED CONTENT | EVENT TO BE IMPLEMENTED BY INFORMATION PROCESSING FUNCTION CONTROL UNIT AFTER RECEPTION OF NOTIFIED CONTENT |
| DETECT DATA WRITE REQUEST FROM EXTERNAL DEVICE | VIRUS DETECTION/REMOVAL FUNCTION IS VALIDATED | | |
| | READ SECURITY FUNCTION STATE NOTIFICATION UNIT<br><br>*WHEN VIRUS SCAN IS BEING IMPLEMENTED → DO NOT IMPLEMENT ANYTHING<br><br>*WHEN VIRUS SCAN IS NOT BEING IMPLEMENTED → IMPLEMENT VIRUS SCAN TO WRITE-TARGET DATA | CONFIRM EVENT WRITTEN INTO SECURITY FUNCTION STATE NOTIFICATION UNIT OR RESULT OF NORMAL/ABNORMAL OF EXECUTION PROCESSING<br><br>* WHEN VIRUS SCAN IS BEING IMPLEMENTED, PROHIBITED WRITING OF DATA<br><br>* WHEN VIRUS SCAN IS NOT BEING IMPLEMENTED, IMPLEMENT VIRUS SCAN TO WRITE-TARGET DATA, AND THEREAFTER PERMIT WRITING OF DATA WHEN IT IS DETERMINED THAT DATA IS NOT A VIRUS | *WHEN VIRUS SCAN IS BEING IMPLEMENTED → DISPLAY PROHIBITION OF WRITING OF DATA FROM EXTERNAL DEVICE ON DISPLAY MONITOR<br><br>*WHEN VIRUS SCAN IS NOT BEING IMPLEMENTED →IMPLEMENT VIRUS SCAN TO WRITE-TARGET DATA, AND THEREAFTER PERMIT WRITING OF DATA WHEN IT IS DETERMINED THAT DATA IS NOT A VIRUS |
| | VIRUS DETECTION/REMOVAL FUNCTION IS INVALIDATED | | |
| | VALIDATE VIRUS DETECTION/ REMOVAL FUNCTION | IMPLEMENT VIRUS SCAN TO WRITE-TARGET DATA, AND THEREAFTER PERMIT WRITING OF DATA WHEN IT IS DETERMINED THAT DATA IS NOT A VIRUS | IMPLEMENT VIRUS SCAN TO WRITE-TARGET DATA, AND THEREAFTER PERMIT WRITING OF DATA WHEN IT IS DETERMINED THAT DATA IS NOT A VIRUS |
| ... | ... | ... | ... |

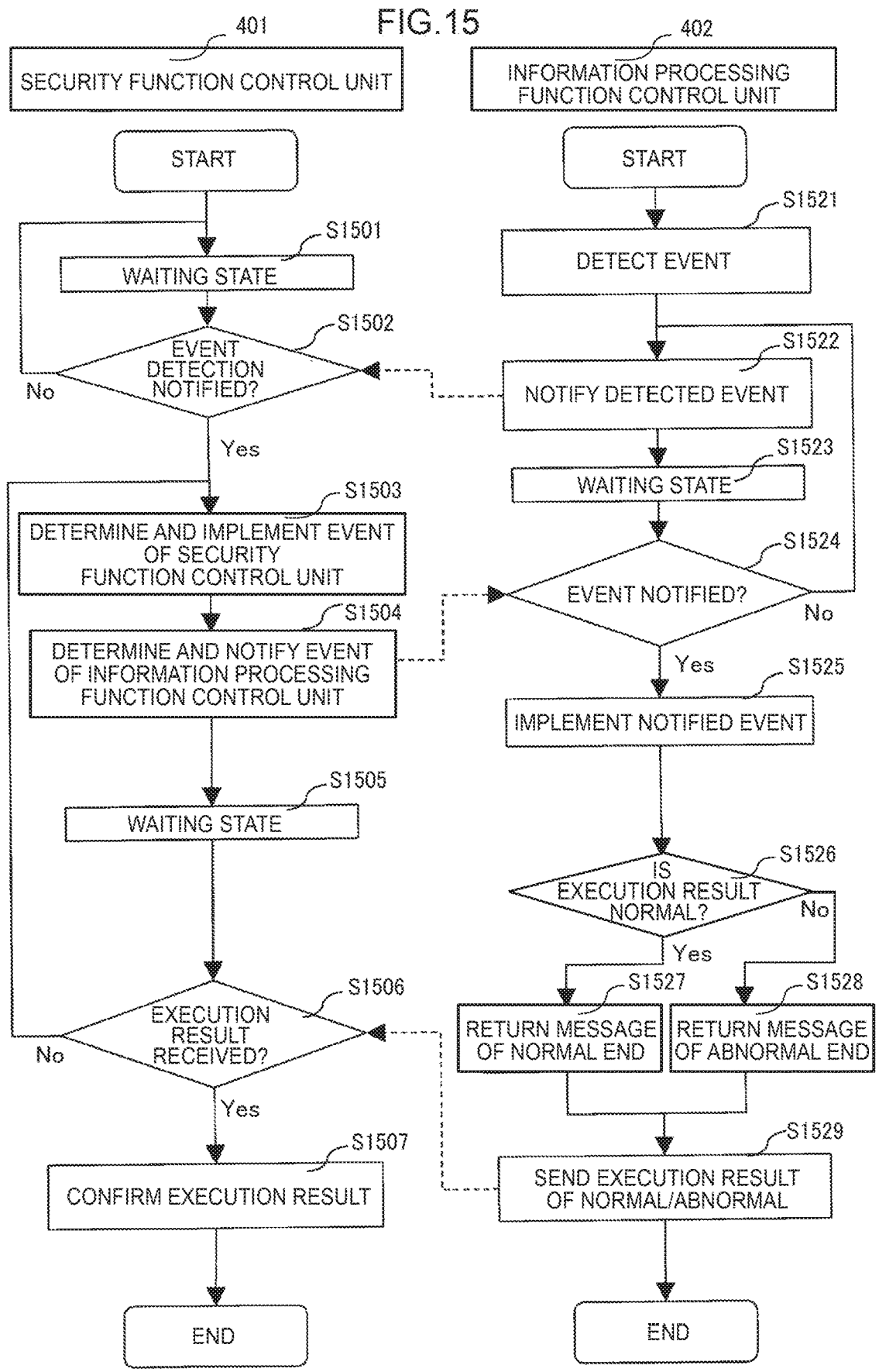

FIG.17

EVENT OPERATION MANAGEMENT TABLE — 304

| VIRUS DETECTION/REMOVAL FUNCTION | | | |
|---|---|---|---|
| EVENT DETECTED BY SECURITY FUNCTION CONTROL UNIT | EVENT TO BE IMPLEMENTED BY SECURITY FUNCTION CONTROL UNIT | NOTIFIED CONTENT | EVENT TO BE IMPLEMENTED BY SECURITY FUNCTION CONTROL UNIT AFTER RECEPTION OF NOTIFIED CONTENT |
| DETECT THAT THERE ARE 1 OR MORE VIRUS SCAN RESULTS | READ SECURITY FUNCTION STATE NOTIFICATION UNIT | PROHIBIT DATA TRANSMISSION TO EXTERNAL DEVICE VIA WIRED COMMUNICATION UNIT AND CLOSE-RANGE WIRELESS COMMUNICATION UNIT | PROHIBIT DATA TRANSMISSION TO EXTERNAL DEVICE VIA WIRED COMMUNICATION UNIT AND CLOSE-RANGE WIRELESS COMMUNICATION UNIT |
| ... | ... | ... | ... |
| ... | ... | ... | ... |

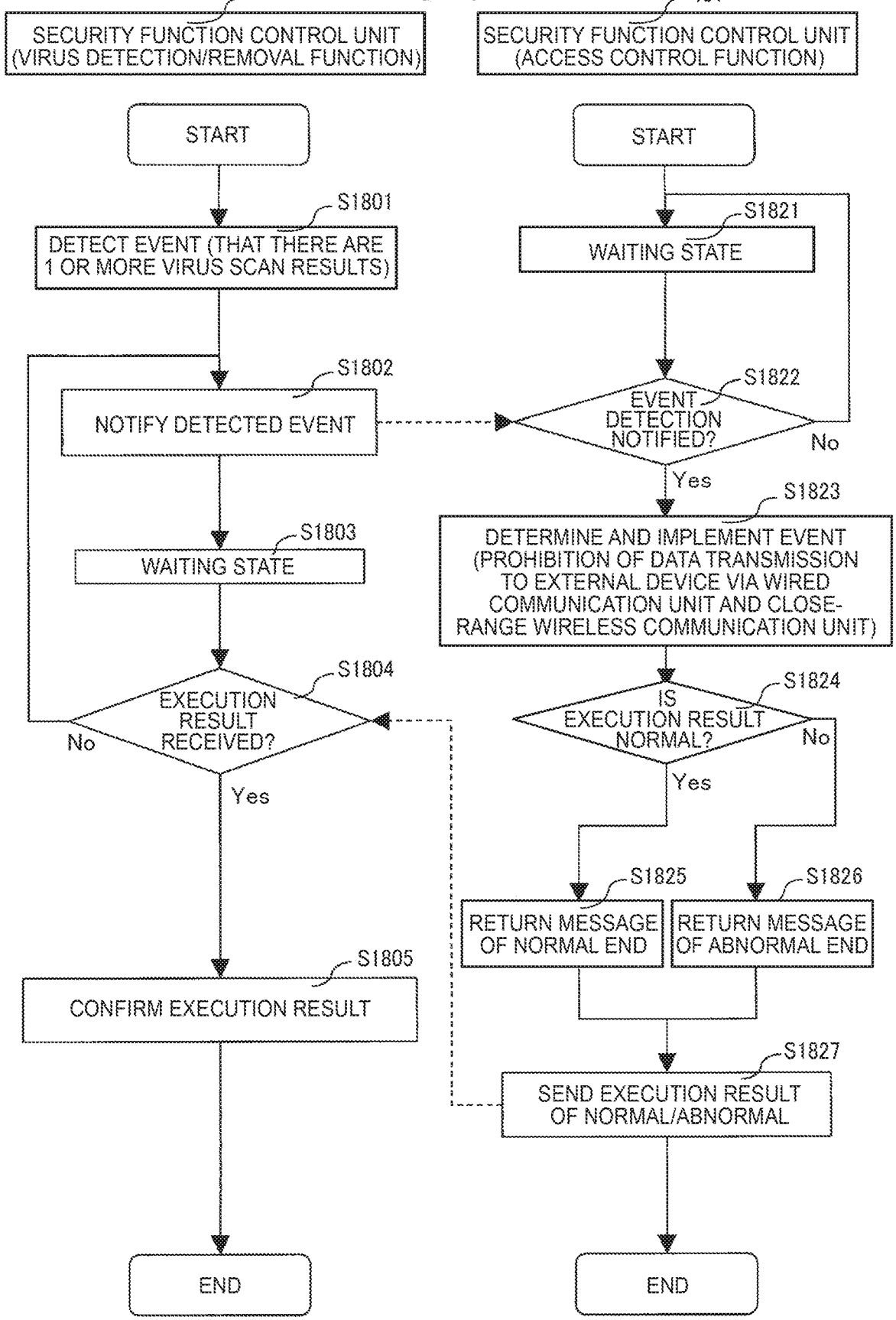

ated to predetermined information processing, and comprises: a control unit which performs control processing for realizing the security function and the information processing function; and a storage unit which stores information related to the security function and the information processing function, wherein: when the control unit detects an occurrence of a predetermined event related to the security function or the information processing function, the control unit determines an operation content of the security function based on the information stored in the storage unit.
INFORMATION PROCESSING DEVICE AND INFORMATION PROCESSING METHOD

TECHNICAL FIELD

The present invention relates to an information processing device and an information processing method.

BACKGROUND ART

In recent years, pursuant to the networking of in-vehicle devices and the increase of in-vehicle software, the necessity to introduce proper information security technologies is increasing even in the automotive sector. Moreover, with embedded equipment adopted in car navigation devices and electronic control units (ECU) of modern automobiles, computational resources such as CPUs and memories are limited, and it is necessary to implement security measures by leveraging these limited computational resources.

Generally speaking, security measures impose a high load on the computational resources. Thus, with in-vehicle devices having limited computational resources, rather than constantly implementing specific security measures, it is desirable to dynamically change the scope of implementation, measures to be implemented, and timing of implementing the security measures. As means for dynamically changing the security measures, the technology of PTL 1 below is known. PTL 1 describes a secure communication method which dynamically determines the security level of communication in light of the security level requested by the communications partner (for instance, encryption only, mutual authentication+encryption, or the like), and the security level personally required by the user.

CITATION LIST

Patent Literature

[PTL 1] Japanese Laid-Open Patent Publication No. H9-116534

SUMMARY OF THE INVENTION

Technical Problem

PTL 1 discloses a method of dynamically changing the security level regarding security functions such as encryption and authentication to be used in the communication. Nevertheless, with this method, there is a problem in that it is not possible to change the security level of security functions not related to communication, such as the security level of the detection and removal of viruses. Moreover, once the security level is set prior to commencing communication, the security level is not changed once the communication is commenced. Thus, the processing for implementing security measures is executed irrespective of the load status of the CPU, and there is a problem in that this may have an adverse effect on the application running on the CPU, or increase the load factor of the CPU.

The present invention was devised in view of the foregoing circumstances. Thus, an object of the present invention is to realize security measures of an information processing device which will not have an adverse effect on the running application or impose a high load on the CPU.

Solution to Problem

An information processing device according to the present invention includes a security function related to information security, and an information processing function related to predetermined information processing, and comprises: a control unit which performs control processing for realizing the security function and the information processing function; and a storage unit which stores information related to the security function and the information processing function, wherein: when the control unit detects an occurrence of a predetermined event related to the security function or the information processing function, the control unit determines an operation content of the security function based on the information stored in the storage unit.

An information processing method according to the present invention is to be performed by an information processing device including a security function related to information security, and an information processing function related to predetermined information processing, wherein: the information processing device comprises a control unit which performs control processing for realizing the security function and the information processing function, and a storage unit which stores information related to the security function and the information processing function; and: when the control unit detects a predetermined event related to the security function or the information processing function, the control unit determines the operation content of the security function based on the information stored in the storage unit.

Advantageous Effects of Invention

According to the present invention, it is possible to realize security measures of an information processing device which will not have an adverse effect on the running application or impose a high load on the CPU.

BRIEF DESCRIPTION OF DRAWINGS

FIG. 5 is an example of a table configuration of the security level management information 301.

FIG. 7 is an example of a table configuration of the security level determination information 303.

FIG. 8 is an example of a table configuration of the event operation management table 304 in the first embodiment.

FIG. 9 is an example of a table configuration of the event operation management table 304 in the first embodiment.

FIG. 11 is an example of a table configuration of the information processing level definition information 312.

FIG. 12 is a flowchart of the security measure processing in the first embodiment.

FIG. 14 is an example of a table configuration of the event operation management table 304 in the second embodiment.

FIG. 15 is a flowchart of the security measure processing in the second embodiment.

FIG. 17 is an example of a table configuration of the event operation management table 304 in the third embodiment.

FIG. 19 is a flowchart showing a specific example of the security measure processing in the third embodiment.

DESCRIPTION OF EMBODIMENTS

Embodiments of the present invention are now explained in detail with reference to the appended drawings.

First Embodiment

Figure 1:
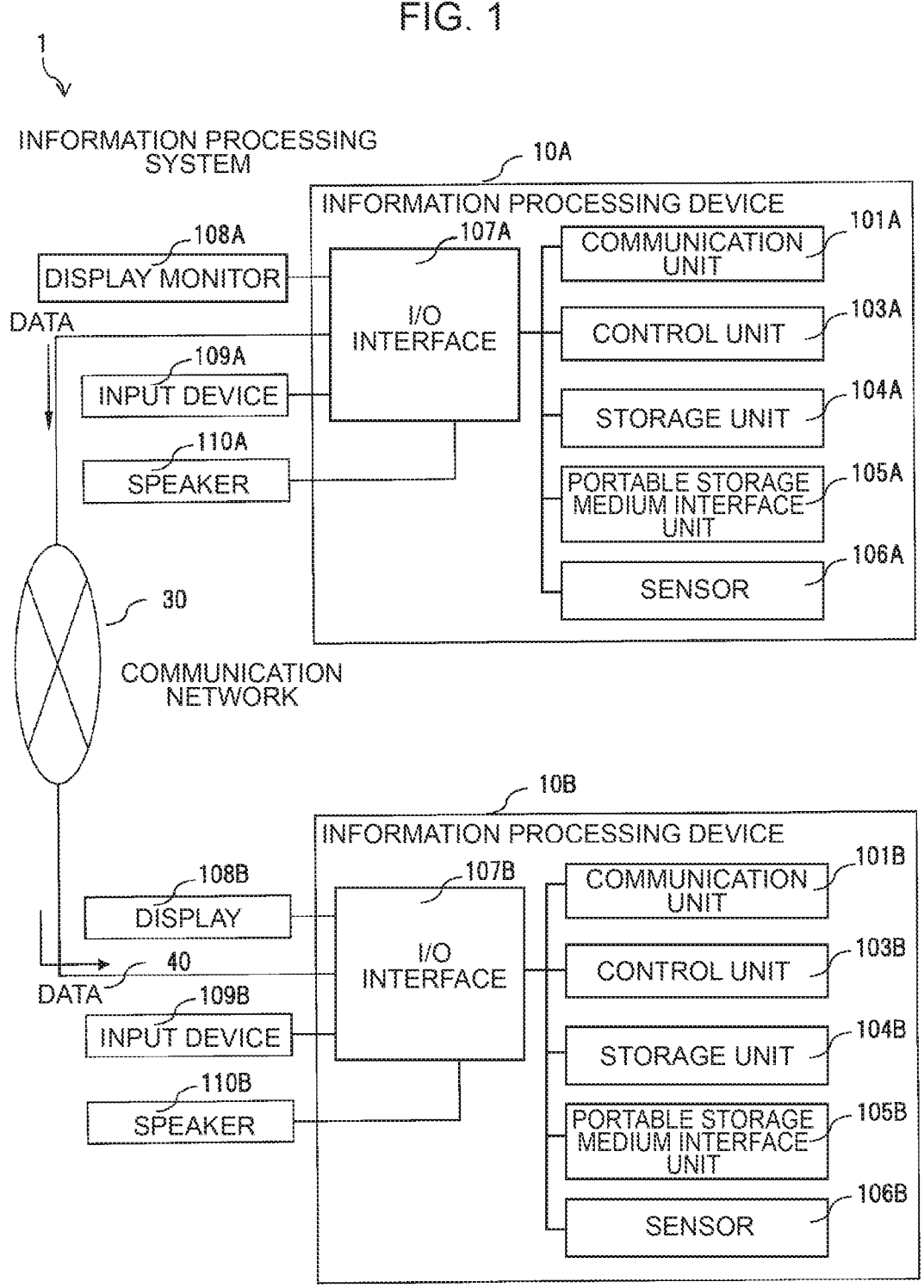
FIG. 1 is a diagram showing a schematic configuration of the information processing system 1.

FIG. 1 shows a schematic configuration of an information processing system 1 according to the first embodiment of the present invention. As shown in FIG. 1, the information processing system 1 includes an information processing device 10A, and an information processing device 10B. The information processing device 10A and the information processing device 10B respectively include an information processing function related to predetermined information processing, and are communicably connected to each other via a communication network 30. Note that the configuration of the information processing system 1 illustrated in FIG. 1 is merely an example. The information processing system 1 may additionally include more information processing devices that are similar to the information processing device 10A and the information processing device 10B.

The information processing device 10A and the information processing device 10B communicate via the communication network 30, and mutually send and receive data. Moreover, the information processing device 10A may also communicate with other communicably connected information processing devices (not shown), and send and receive data.

FIG. 1 depicts an example of a hardware configuration of the information processing devices 10A, 10B. As shown in FIG. 1, the information processing device 10A comprises a communication unit 101A, a control unit 103A, a storage unit 104A, a portable storage medium interface unit 105A, a sensor 106A and an I/O interface 107A. Similarly, the information processing device 10B comprises a communication unit 101B, a control unit 103B, a storage unit 104B, a portable storage medium interface unit 105B, a sensor 106B and an I/O interface 107B. These components are communicably connected to each other via a communication means such as a bus. Moreover, a display 108A, an input device 109A and a speaker 110A are connected to the information processing device 10A. Similarly, a display 108B, an input device 109B and a speaker 1108 are connected to the information processing device 10B.

Note that the information processing device 10A and the information processing device 10B do not necessarily have to be equipped with all components of the foregoing hardware configuration. For instance, when the information processing device 10A or the information processing device 10B is an electronic control unit (ECU) of an automobile, because the display 108A or 108B, the input device 109A or 109B, and the speaker 110A or 1108 are not required, the information processing device 10A or the information processing device 10B does not need to comprise these components. Accordingly, the information processing device 10A and the information processing device 10B respectively retain components according to their usage among the components of the hardware configuration illustrated in FIG. 1.

The information processing device 10A and the information processing device 10B depicted in FIG. 1 can be applied to various usages. For example, the information processing system 1 can be applied to an in-vehicle system by using the information processing device 10A as a navigation device, and by using the information processing device 10B as an electronic control unit (ECU) of an automobile. In the foregoing case, data can be sent and received between the information processing device 10A and the information processing device 10B by using a CAN (Controller Area Network) provided in the vehicle as the communication network 30.

<Navigation Device>

Figure 2:
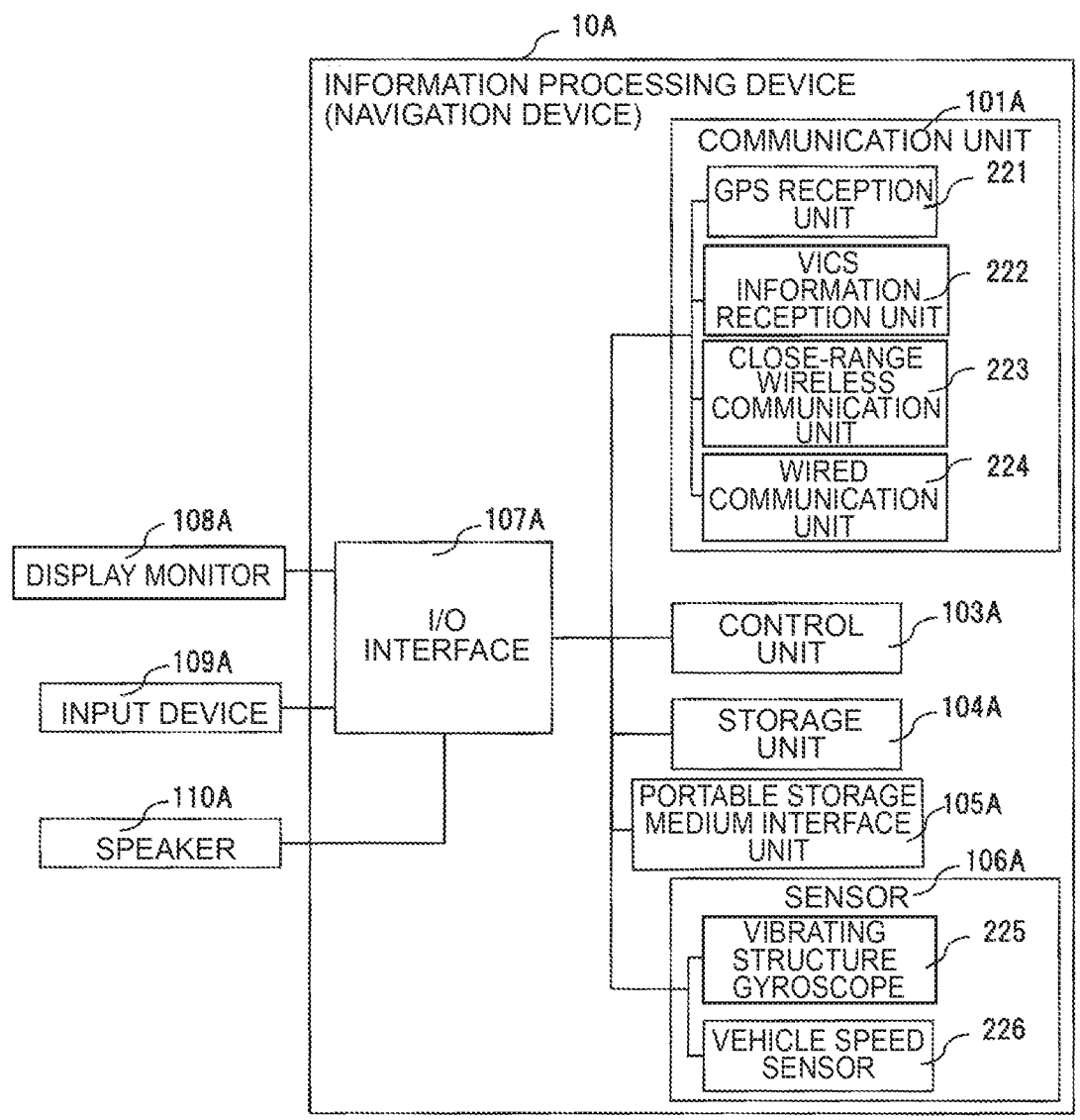
FIG. 2 is an example of a hardware configuration of the navigation device 10A.

FIG. 2 is an example of a hardware configuration of the information processing device 10A in cases where the information processing device 10A is a navigation device (hereinafter referred to as the "navigation device 10A"). As described above, the navigation device 10A comprises a communication unit 101A, a control unit 103A, a storage unit 104A, a portable storage medium interface unit 105A, a sensor 106A and an I/O interface 107A. Moreover, a display 108A, an input device 109A and a speaker 110A are connected to the navigation device 10A.

The communication unit 101A comprises a GPS reception unit 221, a VICS (registered trademark) information reception unit 222, a close-range wireless communication (near field communication) unit 223, and a wired communication unit 224. The GPS reception unit 221 is a receiver which receives GPS signals related to the location information sent from GPS satellites. The VICS information reception unit 222 is a receiver which receives VICS (Vehicle Information and Communication System) information related to traffic congestion and traffic control. The close-range wireless communication unit 223 has a communication function of sending and receiving data to and from the information processing device 10B and other information processing devices via wireless communication such as Bluetooth (registered trademark). The wired communication unit 224 has a communication function of sending and receiving data to and from the information processing device 10B and other information processing devices not shown in FIG. 1 via wired communication such as Ethernet (registered trademark) or CAN.

The control unit 103A is configured, for instance, from a CPU (Central Processing Unit) or an MPU (Micro Processing Unit). The various functions of the navigation device 10A are realized by the control unit 103A reading and executing the programs stored in the storage unit 104A.

The storage unit 104A is a device for storing programs and data. The storage unit 104A is configured, for instance, from a ROM (Read Only Memory), a RAM (Random Access Memory), a NVRAM (Non Volatile RAM), a hard disk drive, a SSD (Solid State Drive), an optical storage device or the like.

The portable storage medium interface unit 105A is an interface device for connecting a portable storage medium to the navigation device 10A. The control unit 103A is able to read data from and write data in a USB memory or various types of memory cards connected via the portable storage medium interface unit 105A.

The sensor 106A comprises a vibrating structure gyroscope 225 and a vehicle speed sensor 226. The vibrating structure gyroscope 225 is a sensor which detects the angular velocity of the vehicle equipped with the information processing device 10A. The vehicle speed sensor 226 is a sensor which detects the speed of the vehicle equipped with the information processing device 10A.

The I/O interface 107A performs interface processing of signals that are input and output between the control unit 103A and the display 108A, the input device 109A and the speaker 110A. The control unit 103A can display a navigation map image on the display 108A by outputting image signals to the display 108A via the I/O interface 107A. Moreover, the control unit 103A can output various types of voices from the speaker 110A by outputting voice signals to the speaker 110A via the I/O interface 107A. Furthermore, the control unit 103A can detect the user's operation performed to the navigation device 10A and perform processing according to the performed operation by acquiring the operation signals output from the input device 109A via the I/O interface 107A.

<Storage Unit 104A>

Figure 3:
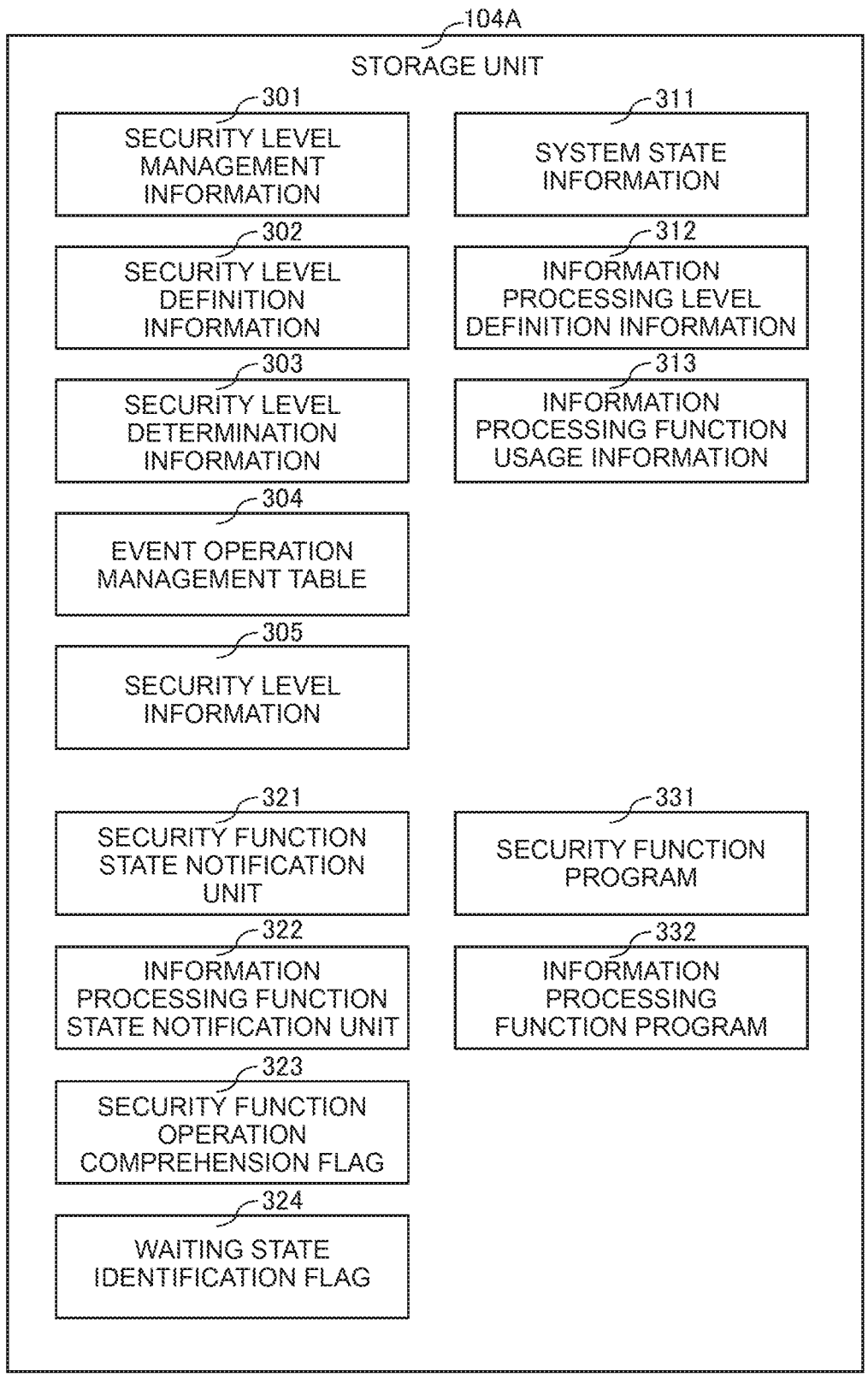
FIG. 3 is an example of various types of data, data areas and programs stored in the storage unit 104A.

The data and programs stored in the storage unit 104A are now explained. The storage unit 104A is a unit which stores information related to the security functions and the information processing functions of the information processing device 10A. FIG. 3 is an example of the various types of data, data areas and programs stored in the storage unit 104A of the information processing device 10A illustrated in FIG. 1. As shown in FIG. 3, the storage unit 104A stores various types of data including security level management information 301, security level definition information 302, security level determination information 303, an event operation management table 304, security level information 305, system state information 311, information processing level definition information 312, and information processing function usage information 313. Moreover, the storage unit 104A also includes the respective data areas including a security function state notification unit 321, an information processing function state notification unit 322, a security function operation comprehension flag 323, and a waiting state identification flag 324. Details regarding the foregoing data and data areas will be explained later.

The storage unit 104A additionally stores a security function program 331, and an information processing function program 332. The security function program 331 is a program for realizing the various types of security functions to be equipped in the information processing device 10A. The information processing function program 332 is a program for realizing the various types of information processing functions to be equipped in the information processing device 10A. For instance, in the case of the navigation device 10A illustrated in FIG. 2, various programs for realizing the navigation function are stored in the storage unit 104A as the information processing function program 332. Specifically, a program for calculating the route to the destination and other programs are included in the information processing function program 332.

<Control Unit 103A>

Figure 4:
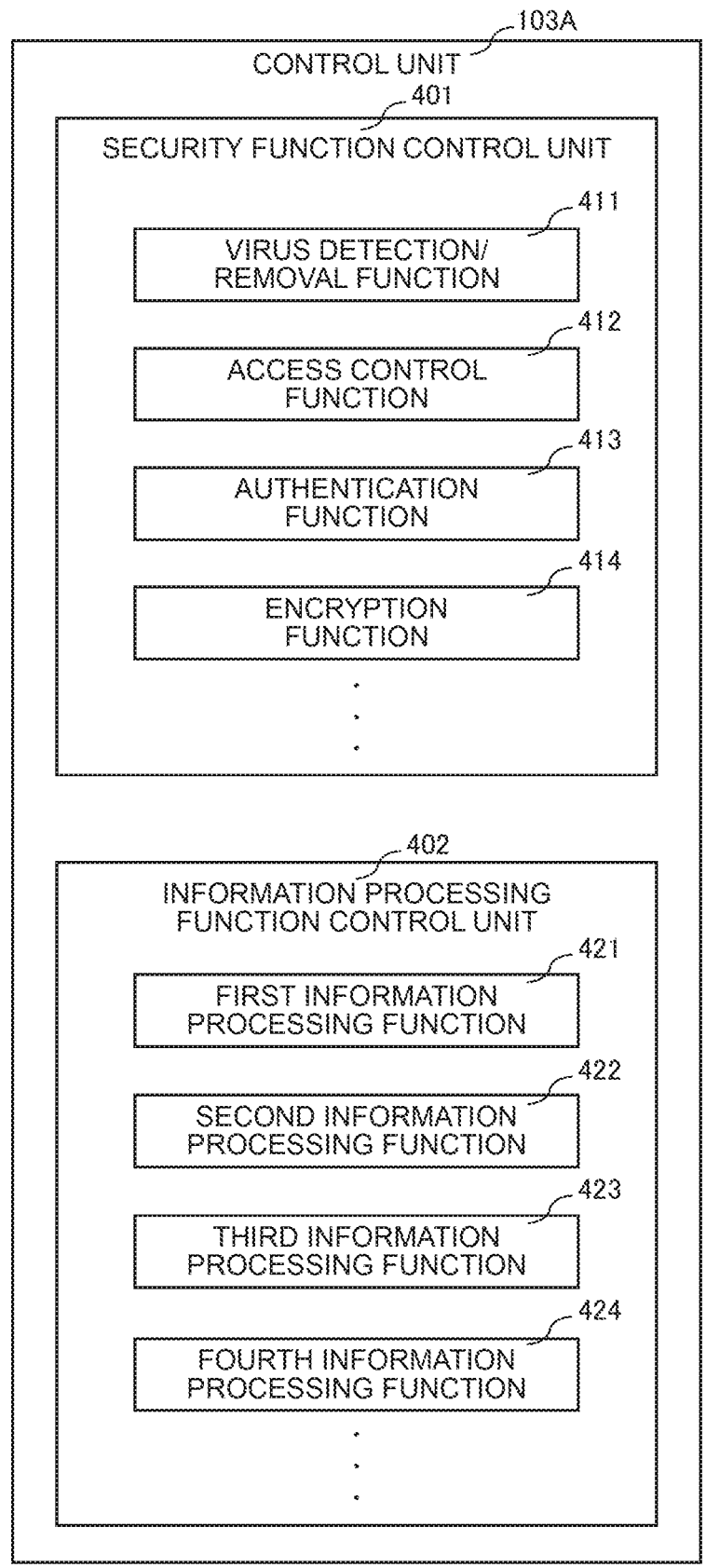
FIG. 4 is a functional block diagram showing an example of the functions that are realized by the control unit 103A.

The functions realized by the control unit 103A are now explained. FIG. 4 is a functional block diagram showing an example of the functions that are realized by the control unit 103A of the information processing device 10A illustrated in FIG. 1. The control unit 103A is a unit which performs control processing for realizing the security functions and the information processing functions of the information processing device 10A. The control unit 103A can realize the respective functions of the security function control unit 401 and the information processing function control unit 402 illustrated in FIG. 4 by respectively reading and executing the security function program 331 and the information processing function program 332 stored in the storage unit 104A as depicted in FIG. 3.

The security function control unit 401 manages the various types of security functions related to information security of the information processing device 10A. The security functions to be managed by the security function control unit 401 include, for instance, a virus detection/removal function 411, an access control function 412, an authentication function 413, and an encryption function 414. Note that the security functions to be managed by the security function control unit 401 may include security functions other than those described above.

The virus detection/removal function 411 is a security function for detecting and removing (deleting) any file or program that may be a virus among the files and programs stored in the storage unit 104A. The access control function 412 is a security function for controlling access from the information processing device 10A to the communications partner. The access control function 412, for instance, restricts the output of data and programs stored in the storage unit 104A to an external memory card, the information processing device 10B or other information processing devices via the portable storage medium interface unit 105A or the communication unit 101A. The access control function 412 additionally restricts the reading of data and programs from a memory card, and restricts the writing of data and programs, which were sent from the information processing device 10B or other information processing devices, into the storage unit 104A. The authentication function 413 is a security function for performing authentication to verify the communications partner. The encryption function 414 is a security function for using cryptographic techniques such as the encryption/decryption, tamper detection and signature of data to be sent and received.

The information processing function control unit 402 manages the information processing functions assigned to the information processing device 10A. For example, in the case of the navigation device 10A illustrated in FIG. 2, the information processing functions to be managed by the information processing function control unit 402 includes various types of navigation functions such as a map display function, a voice output function, a destination search function, and a route search function. In FIG. 4, the information processing functions assigned to the information processing device 10A are not specified, and are illustrated as a first information processing function 421, a second information processing function 422, a third information processing function 423, and a fourth information processing function 424.

Among the information stored in the storage unit 104A illustrated in FIG. 3, the security level management information 301, the security level definition information 302, the security level determination information 303, the event operation management table 304, the system state information 311, and the information processing level definition information 312 are now explained in detail. The other information stored in the storage unit 104A will be explained later.

<Security Level Management Information 301>

The security level management information 301 is information which represents the current set state of the respective security functions managed by the security function control unit 401 of FIG. 4. FIG. 5 is an example of a table configuration of the security level management information 301. The security level management information 301 represents whether each security function is currently valid or invalid, for instance, by taking on the table configuration as shown in FIG. 5.

The table of FIG. 5 shows that the virus detection/removal function is OFF (invalid), and each of the other security functions of access control, authentication, and encryption is ON (valid). In other words, the example of FIG. 5 shows that, with regard to the security level management information 301, the virus detection/removal function 411 is currently invalid, and the access control function 412, the authentication function 413, and the encryption function 414 are currently valid with regard to the respective security functions depicted in FIG. 4.

<Security Level Definition Information 302>

Figure 6:
FIG. 6 is an example of a table configuration of the security level definition information 302.

The security level definition information 302 is information which represents the set state that is defined for each security level of the respective security functions to be managed by the security function control unit 401 of FIG. 4. FIG. 6 is an example of a table configuration of the security level definition information 302. The security level definition information 302 represents whether each security function is currently valid or invalid for each security level, for instance, by taking on the table configuration as shown in FIG. 6.

The table of FIG. 6 shows that all security functions are OFF (invalid) in security level 1, but only the virus detection/removal function is OFF (invalid) and the other security functions are ON (valid) in security level 2. Furthermore, the table of FIG. 6 shows that all security functions are ON (valid) in security level 3. In other words, the example of FIG. 6 shows that, with regard to the security level definition information 302, the virus detection/removal function 411, the access control function 412, the authentication function 413, and the encryption function 414 are all invalid in security level 1 with regard to the respective security functions depicted in FIG. 4. Moreover, the example of FIG. 6 shows that the virus detection/removal function 411 is invalid, but the access control function 412, the authentication function 413, and the encryption function 414 are valid in security level 2. Furthermore, the example of FIG. 6 shows that the virus detection/removal function 411, the access control function 412, the authentication function 413, and the encryption function 414 are all valid in security level 3. Accordingly, because the number of security functions that are validated increases as the security level increases, stronger security measures are implemented.

<Security Level Determination Information 303>

The security level determination information 303 is information for determining the security level to be set. FIG. 7 is an example of a table configuration of the security level determination information 303. The security level determination information 303 represents the security level which is defined according to the interface state of the external device to the information processing device 10A, for instance, by taking on the table configuration as shown in FIG. 7.

The table of FIG. 7 shows that the security level is defined as security level 1 when the number of external devices connected via Bluetooth is 0 devices, defined as security level 2 when the number of external devices connected via Bluetooth is 1 device, and defined as security level 3 when the number of external devices connected via Bluetooth is 2 devices of more. The security function control unit 401 changes the security level, which is referred to in the security level definition information 302 shown in the table of FIG. 6, according to the number of external devices connected to the communication unit 101A via Bluetooth, for instance based on the definitions of FIG. 7. The security function control unit 401 subsequently stores the security level information 305 reflecting the new security level in the storage unit 104A. Note that, in the security level definition information 302, the security level of external interfaces other than Bluetooth such as for a USB memory and various types of memory cards connected via the portable storage medium interface unit 105A is similarly defined according to the state thereof. The security function control unit 401 sets the security level according to the state of various types of interfaces based on the definitions in the security level definition information 302. Note that the relation between the security level and the interface state in the security level definition information 302 may be different for each type of interface, or may be common for all interfaces.

<Event Operation Management Table 304>

The event operation management table 304 is operation management information to be used by the security function control unit 401 and the information processing function control unit 402 of FIG. 4 when they are to manage the operation of the security functions and the information processing functions upon the occurrence of a predetermined event. In this embodiment, the description of the operations (events) to be respectively implemented by the security function control unit 401 and the information processing function control unit 402 upon the occurrence of various events related to the security function is defined for each information processing level in the event operation management table 304. Here, the term "information processing level" is an index for representing the state of the information processing function in the information processing device 10A, and is determined according to the processing load of the control unit 103A and other factors.

FIG. 8 and FIG. 9 show an example of a table configuration of the event operation management table 304 in the first embodiment. The event operation management table 304 represents the event to be implemented by and the content notified from information processing function control unit 402 and the event to be implemented by the security function control unit 401 after receiving the notified content in each information processing level for each detected event of the security function control unit 401 defined with regard to the respective security functions, for instance, by taking on the table configuration as shown in FIG. 8 and FIG. 9. Note that FIG. 8 and FIG. 9 show an example of the detected event operation management table 304 defined in relation to the virus detection/removal function 411 among the security functions managed by the security function control unit 401. While the other security functions; specifically, the access control function 412, the authentication function 413, and the encryption function 414, are not specifically illustrated, the event operation management table 304 for each of them is defined in the same manner as FIG. 8 and FIG. 9.

In the table of FIG. 8 and FIG. 9, among the events related to the virus detection/removal function 411, various events to be detected by the security function control unit 401 are defined as the detected events. The event to be implemented by the information processing function control unit 402 representing the operation content of the information processing function to be implemented by the information processing function control unit 402 and the notified content from the information processing function control unit 402 to the security function control unit 401 are mutually associated and defined for each detected event. Moreover, upon receiving a notice from the information processing function control unit 402, the operation content of the security function to be implemented by the security function control unit 401 is also defined as the event to be implemented by the security function control unit 401 after receiving the notified content.

When the security function control unit 401 detects the occurrence of any detected event defined in FIG. 8 and FIG. 9, the security function control unit 401 notifies the information processing function control unit 402 to such effect. The notification method in this case will be described later. When the information processing function control unit 402 receives a notice from the security function control unit 401, the information processing function control unit 402 determines the information processing level based on the information processing level definition information 312. Subsequently, the information processing function control unit 402 causes one of the information processing functions to implement the operation (event) of the information processing function according to the information processing level based on the definitions of FIG. 8 and FIG. 9. The method of determining the information processing level in this case will be described later. After implementing the event, the information processing function control unit 402 notifies the content based on the definitions of FIG. 8 and FIG. 9 to the security function control unit 401. Upon receiving the notice, the security function control unit 401 causes one of the security functions to implement the operation (event) of the notified security function based on the definitions of FIG. 8 and FIG. 9. Note that the details of the operations of the security function control unit 401 and the information processing function control unit 402 will be explained later with reference to FIG. 12.

<System State Information 311>

Figure 10:
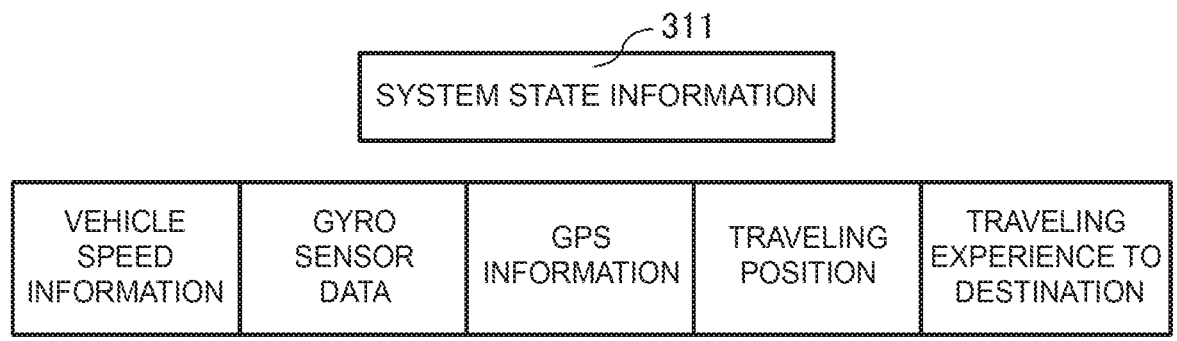
FIG. 10 is an example of a data format of the system state information 311.

The system state information 311 is information which represents the state of the system that is using the information processing device 10A. For example, when the information processing device 10A is installed in a vehicle, information representing the state of the vehicle is stored in the storage unit 104A as the system state information 311. FIG. 10 is an example of a data format of the system state information 311 in the foregoing case. The system state information 311 includes, as the information representing the state of the vehicle equipped with the information processing device 10A, various data such as vehicle speed information, gryo sensor data, GPS information, traveling location, and traveling experience to the destination as shown in FIG. 10. The foregoing data are set based on various types of sensor information acquired from the sensor 106A, GPS information acquired from the GPS reception unit 221, and the like. Note that the data format of the system state information 311 is not limited to the format shown in FIG. 10. So as long as the information matches the respective items of the information processing level definition information 312 described later, any kind of information may be included in the system state information 311.

<Information Processing Level Definition Information 312>

The information processing level definition information 312 is information for determining the information processing level described above, and set in correspondence with the foregoing system state information 311. FIG. 11 is an example of a table configuration of the information processing level definition information 312 corresponding to the system state information 311 illustrated in FIG. 10. The information processing level definition information 312 represents, with regard to the various items representing the state of the vehicle equipped with the information processing device 10A, to which information processing level each item corresponds, for instance, by taking on the table configuration as shown in FIG. 11.

In the table of FIG. 11, the information processing level for each combination of the vehicle speed, the traveling experience to the destination, and the traveling location is defined. For example, the information processing level is defined as 1 when the vehicle speed is less than 60 Km/h, defined as 2 when the vehicle speed is 60 Km/h or more and less than 80 Km/h, and defined as 3 when the vehicle speed is 80 Km/h or more. As described above, the information processing level according to the content is defined for the various items of the vehicle state.

The security level information 305, the information processing function usage information 313, the security function state notification unit 321, the information processing function state notification unit 322, the security function operation comprehension flag 323, and the waiting state identification flag 324 in the storage unit 104A shown in FIG. 3 are now each explained.

<Security Level Information 305>

The security level information 305 is information which represents the security level that is currently set in the information processing device 10A. The setting of this security level is performed by referring to the security level determination information 303 as described above.

<Information Processing Function Usage Information 313>

The information processing function usage information 313 is information which is used in the information processing function assigned to the information processing device 10A. For example, in the case of the navigation device 10A shown in FIG. 2, map information of a map near the current location or for searching the travel route and destination information representing the points that were previously registered as destinations are stored in the storage unit 104A as the information processing function usage information 313.

<Security Function State Notification Unit 321>

The security function state notification unit 321 is the data area which stores information for notifying the detection of an event related to the respective security functions managed by the security function control unit 401. When the security function control unit 401 detects the occurrence of any event defined in the event operation management table 304 illustrated in FIG. 8 and FIG. 9, the security function control unit 401 notifies the detected event to the information processing function control unit 402 by writing predetermined data in the security function state notification unit 321. Preferably, the security function state notification unit 321 is exclusively controlled so that the reading and writing of data from and in the security function state notification unit 321 can be performed for each security function.

<Information Processing Function State Notification Unit 322>

The information processing function state notification unit 322 is a data area which stores information for notifying the event to be implemented by the security function control unit 401. When the information processing function control unit 402 receives the notification of the detected event from the security function control unit 401, the information processing function control unit 402 determines the event to be implemented by the security function control unit 401 representing the operation content of the security function to be performed for the detected event based on the definitions in the event operation management table 304 illustrated in FIG. 8 and FIG. 9. Furthermore, by writing predetermined data in the information processing function state notification unit 322, the information processing function control unit 402 notifies the detected event to be implemented to the security function control unit 401. Note that the information processing function state notification unit 322 is preferably exclusively controlled so that the reading and writing of data from and in the information processing function state notification unit 322 can be performed for each information processing function.

<Security Function Operation Comprehension Flag 323>

The security function operation comprehension flag 323 is a flag to be used for comprehending whether or not the respective security functions managed by the security function control unit 401 are valid. Let it be assumed that the security function operation comprehension flag 323 is being exclusively controlled.

<Waiting State Identification Flag 324>

The waiting state identification flag 324 is a flag to be used for comprehending whether or not the security function control unit 401 and the information processing function control unit 402 are each in a waiting state. Let it be assumed that the waiting state identification flag 324 is being exclusively controlled.

<Processing Flow of Security Function Control Unit 401 and Information Processing Function Control Unit 402>

The processing of the security function control unit 401 and the information processing function control unit 402 is now explained in detail. FIG. 12 is a flowchart of the security measure processing to be executed respectively by the security function control unit 401 and the information processing function control unit 402 in the first embodiment of the present invention.

In step S1201, the security function control unit 401 detects an event that occurred in relation to the security function. Here, when an event defined in the event operation management table 304 illustrated in FIG. 8 and FIG. 9 occurs, the security function control unit 401 detects the occurrence of that event.

In step S1202, the security function control unit 401 notifies the event detected in step S1201 to the information processing function control unit 402. Here, as described above, the detected event is notified from the security function control unit 401 to the information processing function control unit 402 by writing predetermined data in the security function state notification unit 321.

In step S1203, the security function control unit 401 enters a data reception waiting state for receiving data from the information processing function control unit 402.

In step S1221, the information processing function control unit 402 updates the information processing level definition information 312. Here, the information processing function control unit 402 updates the content of the information processing level definition information 312 illustrated in FIG. 11 for each predetermined updating cycle.

In step S1222, the information processing function control unit 402 enters a data reception waiting state for receiving data from the security function control unit 401.

In step S1223, the information processing function control unit 402 determines whether an event detection notice has been received from the security function control unit 401. Here, whether an event detection notice has been received is determined based on whether or not data has been written in the security function state notification unit 321. Consequently, when data has been written in the security function state notification unit 321, the information processing function control unit 402 determines that a detected event has been notified from the security function control unit 401 in step S1202, and then proceeds to step S1224. Meanwhile, when data has not been written into the security function state notification unit 321, the information processing function control unit 402 determines that an event detection notice from the security function control unit 401 has not been received, and returns to step S1221.

In step S1224, the information processing function control unit 402 acquires the system state information 311 stored in the storage unit 104A. Here, the information processing function control unit 402 acquires the state of the vehicle equipped with the information processing device 10A, for instance, by acquiring the system state information 311 described in a data format as shown in FIG. 10.

In step S1225, the information processing function control unit 402 determines the information processing level representing the state of the information processing function in the information processing device 10A based on the system state information 311 acquired in step S1224. Here, the information processing function control unit 402 determines the information processing level corresponding to the acquired system state information 311 by referring to the information processing level definition information 312. Note that, here, when the corresponding information processing level is different for each item of the system state information 311, it is preferable to determine the comprehensive information processing level based on the foregoing information processing levels. For example, the comprehensive information processing level can be determined according to the determination logic that is pre-loaded in the information processing function program 332. As the determination logic, there is, for example, a method of taking the maximum value among the information processing levels determined for each item. However, the method of determining the comprehensive information processing level is not limited to the foregoing method, and any feasible method may be adopted.

In step S1226, the information processing function control unit 402 determines the event to be implemented by the information processing function control unit 402 based on the detected event notified from the security function control unit 401 in step S1223, the information processing level determined in step S1225, and the event operation management table 304 stored in the storage unit 104A. Here, the information processing function control unit 402 determines the event to be implemented by the information processing function control unit 402 corresponding to the detected event and the information processing level by referring to the event operation management table 304 as illustrated in FIG. 8 and FIG. 9. After determining the event to be implemented, the information processing function control unit 402 implements the event by using one of the information processing functions illustrated as the first information processing function 421, the second information processing function 422, the third information processing function 423, and the fourth information processing function 424 in FIG. 4. Note that, depending on the detected event or the information processing level, there may be no event to be implemented by the information processing function control unit 402. In the foregoing case, the information processing function control unit 402 does not need to execute any processing in step S1226.

In step S1227, the information processing function control unit 402 determines the event to be implemented by the security function control unit 401 based on the detected event notified from the security function control unit 401 in step S1223, the information processing level determined in step S1225, and the event operation management table 304 stored in the storage unit 104A. Here, the information processing function control unit 402 determines the content to be notified corresponding to the detected event and the information processing level and the event to be implemented by the security function control unit 401 after receiving the notified content, by referring to the event operation management table 304 as illustrated in FIG. 8 and FIG. 9. After the content to be notified to the security function control unit 401 and the event to be implemented by the security function control unit 401 are determined, the information processing function control unit 402 notifies the determination result to the security function control unit 401. Here, as described above, the event to be implemented can be notified by writing predetermined data in the information processing function state notification unit 322.

In step S1228, the information processing function control unit 402 enters a data reception waiting state for receiving data from the security function control unit 401.

In step S1204, the security function control unit 401 determines whether or not the event to be implemented has been received from the information processing function control unit 402. Here, the security function control unit 401 determines whether an event notice has been received based on whether or not data has been written in the information processing function state notification unit 322. Consequently, when data has been written in the information processing function state notification unit 322, the security function control unit 401 determines that the event to be implemented has been received from the information processing function control unit 402 in step S1227, and then proceeds to step S1205. Meanwhile, when data has not been written in the information processing function state notification unit 322, the security function control unit 401 determines that an event notice from the information processing function control unit 402 has not been received, and returns to step S1202.

In step S1205, the security function control unit 401 implements the event notified from the information processing function control unit 402 in step S1204 by using one of the security functions illustrated as the virus detection/removal function 411, the access control function 412, the authentication function 413, and the encryption function 414 in FIG. 4. Here, the security function control unit 401 implements the notified event by performing the event to be implemented by the security function control unit 401 after receiving the notified event from the information processing function control unit 402 according to the event operation management table 304 as illustrated in FIG. 8 and FIG. 9. The security function control unit 401 thereby manages the security function based on the notice from the information processing function control unit 402.

In step S1206, the security function control unit 401 determines whether the execution result of the event implemented in step S1205 is normal. The security function control unit 401 proceeds to step S1207 when the event execution result is normal as a result of the determination, and proceeds to step S1208 when the event execution result is abnormal.

In step S1207, the security function control unit 401 returns a message to the effect that the event implemented in step S1205 ended normally as the event execution result. After executing step S1207, the security function control unit 401 proceeds to step S1209.

In step 31208, the security function control unit 401 returns a message to the effect that the event implemented in step S1205 ended abnormally as the event execution result. After executing step S1208, the security function control unit 401 proceeds to step S1209.

In step S1209, the security function control unit 401 sends the event execution result obtained in step S1207 or step S1208 to the information processing function control unit 402. Here, similar to step S1202, the event execution result can be sent from the security function control unit 401 to the information processing function control unit 402 by writing predetermined data in the security function state notification unit 321. After executing the processing of step S1209, the security function control unit 401 ends the security measure processing shown in the flowchart of FIG. 12.

In step S1229, the information processing function control unit 402 determines whether or not an event execution result has been received from the security function control unit 401. Here, the information processing function control unit 402 determines whether an event execution result has been received based on whether or not data has been written in the security function state notification unit 321. Consequently, the information processing function control unit 402 determines that an event execution result has been sent from the security function control unit 401 in step S1209 when data has been written in the security function state notification unit 321, and then proceeds to step S1230. Meanwhile, the information processing function control unit 402 determines that an event execution result has not been sent from the security function control unit 401 when data has not been written in the security function state notification unit 321, and returns to step S1226.

In step S1230, the information processing function control unit 402 confirms the event execution result received from the security function control unit 401 in step S1229. After executing the processing of step S1230, the information processing function control unit 402 ends the security measure processing shown in the flowchart of FIG. 12.

Figure 13:
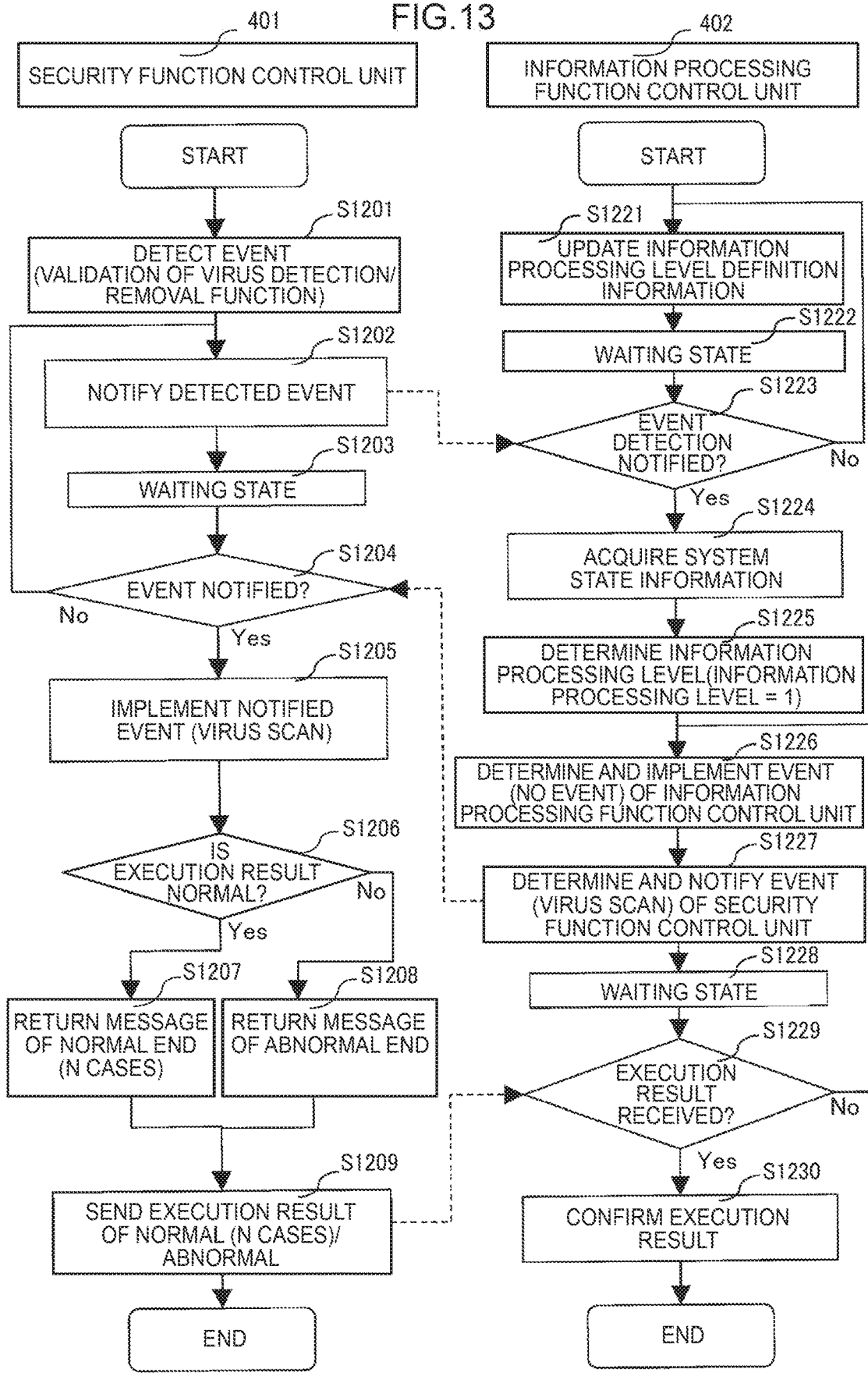
FIG. 13 is a flowchart showing a specific example of the security measure processing in the first embodiment.

Specific examples of the processing of the security function control unit 401 and the information processing function control unit 402 are now explained with reference to FIG. 13. FIG. 13 is a flowchart showing a specific example of the security measure processing to be respectively executed by the security function control unit 401 and the information processing function control unit 402 in the first embodiment of the present invention. FIG. 13 shows an example where the security function control unit 401 detected the validation of the virus detection/removal function as an event related to the virus detection/removal function 411.

Note that, in the flowchart of FIG. 13, the same step numbers as FIG. 12 are assigned to the respective processing steps corresponding to the flowchart of FIG. 12. In the ensuing explanation, the explanation of contents that are common with those previously explained in FIG. 12 is omitted.

In step S1201, the security function control unit 401 detects the validation of the virus detection/removal function.

In step S1202, the security function control unit 401 notifies the event detected in step S1201; that is, the validation of the virus detection/removal function, to the information processing function control unit 402.

In step S1223, the information processing function control unit 402 determines whether or not a notice to the effect that the validation of the virus detection/removal function has been detected was received from the security function control unit 401. The information processing function control unit 402 proceeds to step S1224 when data indicating the validation of the virus detection/removal function has been written in the security function state notification unit 321.

In step S1225, the information processing function control unit 402 determines the information processing level based on the system state information 311 acquired in step S1224. Here, the ensuing explanation is provided on the assumption that the information processing level has been set to 1.

In step S1226, the information processing function control unit 402 refers to the event operation management table 304 illustrated in FIG. 8 and FIG. 9, and determines the event to be implemented by the information processing function control unit 402. Here, because the detected event of the security function control unit 401 is the validation of the virus detection/removal function and the information processing level is 1, the event to be implemented by the information processing function control unit 402 is determined as "None" based on the event operation management table 304 shown in FIG. 8. Accordingly, the information processing function control unit 402 does not execute any processing in step S1226.

In step S1227, the information processing function control unit 402 refers to the event operation management table 304 illustrated in FIG. 8 and FIG. 9, and determines the event to be implemented by the security function control unit 401. Here, because the detected event of the security function control unit 401 is the validation of the virus detection/removal function and the information processing level is 1, the information processing function control unit 402 determines that the content notified from the event operation management table 304 shown in FIG. 8 to the security function control unit 401 to be the permission to execute a virus scan. Moreover, the information processing function control unit 402 determines that the event to be implemented by the security function control unit 401 that received the foregoing notice is to execute a virus scan, and notifies the result to the security function control unit 401. After determining the event to be implemented by the security function control unit 401, the information processing function control unit 402 notifies the determined event to the security function control unit 401.

In step S1204, the security function control unit 401 determines whether or not a notice permitting the execution of a virus scan has been received from the information processing function control unit 402. The security function control unit 401 proceeds to step S1205 when data indicating the permission to execute a virus scan has been written in the information processing function state notification unit 322.

In step S1205, the security function control unit 401 executes the virus scan by using the virus detection/removal function 411 based on the notice from the information processing function control unit 402 received in step S1204.

In step S1206, the security function control unit 401 determines whether or not the result of the virus scan executed in step S1205 was normal. The security function control unit 401 proceeds to step S1207 when the result was normal, and returns a message to the effect that the virus scan ended normally and the number (N) of detected viruses as the event execution result of the security function control unit 401. Meanwhile, when the result was abnormal, the security function control unit 401 proceeds to step S1208, and returns a message to the effect that the virus scan ended abnormally as the event execution result of the security function control unit 401.

In step S1209, the security function control unit 401 sends the result of the virus scan obtained in step S1207 or step S1208 to the information processing function control unit 402.

<Effect of Security Measures in First Embodiment>

According to the first embodiment explained above, it is possible to prevent the implementation of security measures at a timing that is inappropriate for the application of the information processing device 10A. Thus, it is possible to realize security measures that will not affect the application running on the information processing device 10A or impose a high load on the CPU. The reasons for this are as follows.

In the event operation management table 304 illustrated in FIG. 8 and FIG. 9, the content of the processing to be executed by the security function control unit 401 is defined so that it is changed according to the information processing level. Thus, in the event operation management table 304, the operation content of the security function control unit 401 should be defined so that security measures are not executed at an inappropriate timing. It is thereby possible to realize security measures without affecting other applications. Moreover, similarly, it is anticipated that the CPU utilization of the respective information processing functions managed by the information processing function control unit 402 will change according to the information processing level. Thus, in the event operation management table 304, the operation content of the security function control unit 401 should be defined in advance so that the security function control unit 401 does not perform the processing that would increase the CPU utilization when information processing that increases the CPU utilization is being performed. It is thereby possible to realize security measures which will not impose a high load on the CPU.

According to the first embodiment of the present invention explained above, the following effects are yielded.

(1) The information processing device 10A includes a security function related to information security, and an information processing function related to predetermined information processing. The information processing device 10A comprises a control unit 103A which performs control processing for realizing the security function and the information processing function, and a storage unit 104A which stores information related to the security function and the information processing function. When the control unit 103A detects an occurrence of a predetermined event related to the security function (step S1201), the control unit 103A determines an operation content of the security function based on the information stored in the storage unit 104A (step S1227). Consequently, it is possible to realize security measures of an information processing device which will not have an adverse effect on a running application or impose a high load on the CPU.

(2) The control unit 103A includes a security function control unit 401 which manages the security function, and an information processing function control unit 402 which manages the information processing function. The storage unit 104A stores an event operation management table 304 as operation management information with which an event related to the security function, a state of the information processing function and an operation content of the security function are associated. When the security function control unit 401 detects an occurrence of an event related to the security function (step S1201), the security function control unit 401 notifies the detected event to the information processing function control unit 402 (step S1202). The information processing function control unit 402 determines the operation content of the security function based on the event notified from the security function control unit 401, the state of the information processing function and the event operation management table 304 stored in the storage unit 104A, and notifies the determined operation content of the security function to the security function control unit 401 (step S1227). The security function control unit 401 manages the security function based on the operation content of the security function notified from the information processing function control unit 402 by implementing the event based on the operation content (step S1205). Consequently, it is possible to appropriately perform security measures of an information processing device according to the event that occurred or the state of the information processing function.

(3) When the information processing device 10A is installed in a vehicle, the information processing function control unit 402 can determine the information processing level according to the state of the information processing function based on the system state information 311 representing the state of the vehicle (step S1225). Consequently, it is possible to determine the security measures to be performed by the information processing device by accurately reflecting the state of the information processing function in the information processing device.

Second Embodiment

In the first embodiment, a case was explained where the information processing function control unit 402 determines the content of the security measures to be implemented by the security function control unit 401 when the security function control unit 401 detects an event and notifies the detected event to the information processing function control unit 402. Meanwhile, in the second embodiment, a case is explained where the security function control unit 401 determines the content of the processing to be implemented by the information processing function control unit 402 when the information processing function control unit 402 detects an event and notifies the detected event to the security function control unit 401.

In the second embodiment, the configuration of the information processing system 1 and the information processing device 10A is the same as the configuration of the first embodiment shown in FIG. 1 and FIG. 2. Moreover, the data and programs stored in the storage unit 104A, and the functional block of the control unit 103A, are also the same as those of the first embodiment shown in FIG. 3 and FIG. 4. Furthermore, the contents of the security level management information 301, the security level definition information 302, the security level determination information 303, the system state information 311, and the information processing level definition information 312 are the same as those of the first embodiment shown in FIG. 5 to FIG. 7, FIG. 10 and FIG. 11. The contents of the information processing function usage information 313, the security function state notification unit 321, the information processing function state notification unit 322, the security function operation comprehension flag 323, and the waiting state identification flag 324 are also the same as those explained in the first embodiment. Thus, the explanation of the foregoing contents are omitted.

Meanwhile, in the second embodiment, the event operation management table 304 is stored in the storage unit 104A by including contents that are different from the first embodiment. Specifically, in the event operation management table 304 used in this embodiment, the contents of the operations (events) to be respectively implemented by the security function control unit 401 and the information processing function control unit 402 when various events related to the information processing function occur are defined.

FIG. 14 is an example of a table configuration of the event operation management table 304 in the second embodiment. The event operation management table 304 represents the event to be implemented by and the content to be notified from the security function control unit 401, and the event to be implemented by the information processing function control unit 402 after receiving the notified content for each detected event of the information processing function control unit 402 defined regarding the respective information processing functions, for instance, by taking on the table configuration as shown in FIG. 14. Note that FIG. 14 illustrates an example of the detected event operation management table 304 defined in relation to the foregoing navigation function as one of the information processing functions managed by the information processing function control unit 402. While the other information processing functions are not specifically illustrated, the event operation management table 304 is defined in the same manner as FIG. 14.

In the table of FIG. 14, various events to be detected by the information processing function control unit 402 are defined as the detected events. The event to be implemented by the security function control unit 401 representing the operation content of the security function to be implemented by the security function control unit 401 and the notified content from the security function control unit 401 to the information processing function control unit 402 are mutually associated and defined for each detected event. Moreover, upon receiving a notice from the security function control unit 401, the operation content of the information processing function to be implemented by the information processing function control unit 402 is also defined as the event to be implemented by the information processing function control unit 402.

When the information processing function control unit 402 detects the occurrence of any detected event defined in FIG. 14, the information processing function control unit 402 notifies the security function control unit 401 to such effect. When the security function control unit 401 receives a notice from the information processing function control unit 402, the security function control unit 401 causes one of the security functions to implement the operation (event) of the security function based on the definitions of FIG. 14. After implementing the event, the security function control unit 401 notifies the content based on the definitions of FIG. 14 to the information processing function control unit 402. Upon receiving the notice, the information processing function control unit 402 causes one of the information processing functions to implement the operation (event) of the notified information processing function based on the definitions of FIG. 14.

<Processing Flow of Security Function Control Unit 401 and Information Processing Function Control Unit 402>

The processing of the security function control unit 401 and the information processing function control unit 402 is now explained in detail. FIG. 15 is a flowchart of the security measure processing to be executed respectively by the security function control unit 401 and the information processing function control unit 402 in the second embodiment of the present invention.

In step S1521, the information processing function control unit 402 detects an event that occurred in relation to the information processing function. Here, when an event defined in the event operation management table 304 illustrated in FIG. 14 occurs, the information processing function control unit 402 detects the occurrence of that event.

In step S1522, the information processing function control unit 402 notifies the event detected in step S1521 to the security function control unit 401. Here, the detected event is notified from the information processing function control unit 402 to the security function control unit 401 by writing predetermined data in the information processing function state notification unit 322.

In step S1523, the information processing function control unit 402 enters a data reception waiting state for receiving data from the security function control unit 401.

In step S1501, the security function control unit 401 enters a data reception waiting state for receiving data from the information processing function control unit 402.

In step S1502, the security function control unit 401 determines whether an event detection notice has been received from the information processing function control unit 402. Here, whether an event detection notice has been received is determined based on whether or not data has been written in the information processing function state notification unit 322. Consequently, when data has been written in the information processing function state notification unit 322, the security function control unit 401 determines that a detected event has been notified from the information processing function control unit 402 in step S1522, and then proceeds to step S1503. Meanwhile, when data has not been written into the information processing function state notification unit 322, the security function control unit 401 determines that an event detection notice from the information processing function control unit 402 has not been received, and returns to step S1501.

In step S1503, the security function control unit 401 determines the event to be implemented by the security function control unit 401 based on the detected event notified from the information processing function control unit 402 in step S1502, and the event operation management table 304 stored in the storage unit 104A. Here, the security function control unit 401 determines the event to be implemented by the security function control unit 401 corresponding to the detected event by referring to the event operation management table 304 as illustrated in FIG. 14. After determining the event to be implemented, the security function control unit 401 implements the event by using one of the security functions illustrated as the virus detection/removal function 411, the access control function 412, the authentication function 413, and the encryption function 414 in FIG. 4.

In step S1504, the security function control unit 401 determines the event to be implemented by the information processing function control unit 402 based on the detected event notified from the information processing function control unit 402 in step S1502, and the event operation management table 304 stored in the storage unit 104A. Here, the security function control unit 401 determines the content to be notified corresponding to the detected event and the event to be implemented by the information processing function control unit 402 after receiving the notified content by referring to the event operation management table 304 as illustrated in FIG. 14. After the content to be notified to the information processing function control unit 402 and the event to be implemented by the information processing function control unit 402 are determined, the security function control unit 401 notifies the determination result to the information processing function control unit 402. Here, the event to be implemented can be notified by writing predetermined data in the security function state notification unit 321.

In step S1505, the security function control unit 401 enters a data reception waiting state for receiving data from the information processing function control unit 402.

In step S1524, the information processing function control unit 402 determines whether or not the event to be implemented has been received from the security function control unit 401. Here, the information processing function control unit 402 determines whether an event notice has been received based on whether or not data has been written in the security function state notification unit 321. Consequently, when data has been written in the security function state notification unit 321, the information processing function control unit 402 determines that the event to be implemented has been received from the security function control unit 401 in step S1504, and then proceeds to step S1525. Meanwhile, when data has not been written in the security function state notification unit 321, the information processing function control unit 402 determines that an event notice from the security function control unit 401 has not been received, and returns to step S1522.

In step S1525, the information processing function control unit 402 implements the event notified from the security function control unit 401 in step S1524 by using one of the information processing functions illustrated as the first information processing function 421, the second information processing function 422, the third information processing function 423, and the fourth information processing function 424 in FIG. 4. Here, the information processing function control unit 402 implements the event notified by performing the event to be implemented by the information processing function control unit 402 after receiving the notified content from the security function control unit 401 according to the event operation management table 304 as illustrated in FIG. 14. The information processing function control unit 402 thereby manages the information processing function based on the notice from the security function control unit 401.

In step S1526, the information processing function control unit 402 determines whether the execution result of the event implemented in step S1525 is normal. The information processing function control unit 402 proceeds to step S1527 when the event execution result is normal as a result of the determination, and proceeds to step S1528 when the event execution result is abnormal.

In step S1527, the information processing function control unit 402 returns a message to the effect that the event implemented in step S1525 ended normally as the event execution result. After executing step S1527, the information processing function control unit 402 proceeds to step S1529.

In step S1528, the information processing function control unit 402 returns a message to the effect that the event implemented in step S1525 ended abnormally as the event execution result. After executing step S1528, the information processing function control unit 402 proceeds to step S1529.

In step S1529, the information processing function control unit 402 sends the event execution result obtained in step S1527 or step S1528 to the security function control unit 401. Here, similar to step S1522, the event execution result can be sent from the information processing function control unit 402 to the security function control unit 401 by writing predetermined data in the information processing function state notification unit 322. After executing the processing of step S1529, the information processing function control unit 402 ends the security measure processing shown in the flowchart of FIG. 15.

In step S1506, the security function control unit 401 determines whether or not an event execution result has been received from the information processing function control unit 402. Here, the security function control unit 401 determines whether an event execution result has been received based on whether or not data has been written in the information processing function state notification unit 322. Consequently, the security function control unit 401 determines that an event execution result has been sent from the information processing function control unit 402 in step S1529 when data has been written in the information processing function state notification unit 322, and then proceeds to step S1507. Meanwhile, the security function control unit 401 determines that an event execution result has not been sent from the information processing function control unit 402 when data has not been written in the information processing function state notification unit 322, and returns to step S1503.

In step S1507, the security function control unit 401 confirms the event execution result received from information processing function control unit 402 in step S1506. After executing the processing of step S1507, the security function control unit 401 ends the security measure processing shown in the flowchart of FIG. 15.

Figure 16:
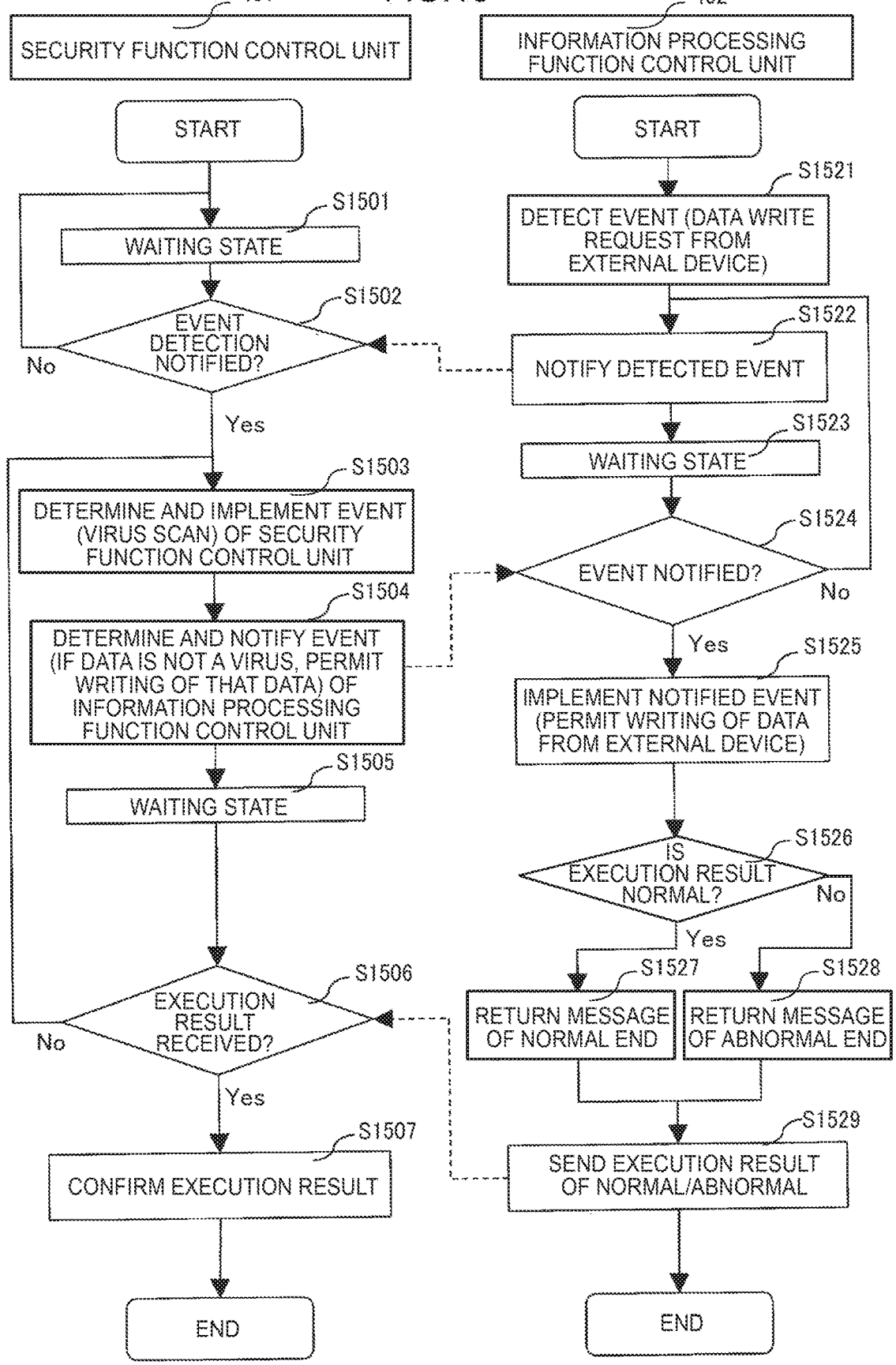
FIG. 16 is a flowchart showing a specific example of the security measure processing in the second embodiment.

Specific examples of the processing of the security function control unit 401 and the information processing function control unit 402 are now explained with reference to FIG. 16. FIG. 16 is a flowchart showing a specific example of the security measure processing to be respectively executed by the security function control unit 401 and the information processing function control unit 402 in the second embodiment of the present invention. FIG. 16 shows an example where the information processing function control unit 402 detects a data writing request from an external device as an event related to the information processing function.

Note that, in the flowchart of FIG. 16, the same step numbers as FIG. 15 are assigned to the respective processing steps corresponding to the flowchart of FIG. 15. In the ensuing explanation, the explanation of contents that are common with those previously explained in FIG. 15 is omitted.

In step S1521, the information processing function control unit 402 detects a data writing request from an external device for writing data in the storage unit 104A.

In step S1522, the information processing function control unit 402 notifies the event detected in step S1521; that is, the data writing request from an external device, to the security function control unit 401.

In step S1502, the security function control unit 401 determines whether or not a notice to the effect that a data writing request from an external device was received from the information processing function control unit 402. The security function control unit 401 proceeds to step S1503 when data indicating the data writing request from an external device has been written in the information processing function state notification unit 322.

In step S1503, the security function control unit 401 refers to the event operation management table 304 illustrated in FIG. 14, and determines the event to be implemented by the security function control unit 401. Here, let it be assumed that the virus detection/removal function 411 is in a valid state, and a virus scan is not being executed. In the foregoing case, because the detected event of the information processing function control unit 402 is a data writing request from an external device, the security function control unit 401 determines that the event to be implemented by the security function control unit 401 is to execute a virus scan to the data to be written based on the event operation management table 304 shown in FIG. 14. Accordingly, the security function control unit 401 executes a virus scan to the data to be written from the external device by using the virus detection/removal function 411. Consequently, let it be assumed that the data to be written was free from any virus.

In step S1504, the security function control unit 401 refers to the event operation management table 304 illustrated in FIG. 14, and determines the event to be implemented by the information processing function control unit 402. Here, because the detected event of the information processing function control unit 402 is a data writing request from an external device, the security function control unit 401 determines that the event to be implemented by the information processing function control unit 402 is to permit the writing of data when it is determined that the data is free from any virus after the execution of a virus scan based on the event operation management table 304 shown in FIG. 14. After determining the event to be implemented by the information processing function control unit 402, the security function control unit 401 notifies the determined event to the information processing function control unit 402.

In step S1524, the information processing function control unit 402 determines whether or not a notice permitting the writing of data from an external device has been received from the security function control unit 401 as a result of no virus being detected in the data to be written from the external device. The information processing function control unit 402 proceeds to step S1525 when data indicating the permission to write data from an external device has been written in the security function state notification unit 321.

In step S1525, the information processing function control unit 402 permits the writing of data from an external device based on the notice from the security function control unit 401 received in step S1524.

In step S1526, the information processing function control unit 402 determines whether or not the writing of data from an external device permitted in step S1525 was normal. Subsequently, in step S1529, the information processing function control unit 402 sends the event execution result of normal or abnormal obtained in step S1527 or step S1528 to the security function control unit 401.

<Effect of Security Measures in Second Embodiment>

According to the second embodiment explained above, it is possible to realize security measures that will not impose a high load on the CPU. The reasons for this are as follows.

In the event operation management table 304 illustrated in FIG. 14, the content of the processing to be executed by the information processing function control unit 402 is defined so that it is changed according to the security measures being implemented. Thus, in the event operation management table 304, the operation content of the information processing function control unit 402 should be defined in advance so that the information processing function control unit 402 does not perform information processing that would increase the CPU utilization when security measures that increases the CPU utilization are being performed. It is thereby possible to realize security measures which will not impose a high load on the CPU.

According to the second embodiment of the present invention explained above, the following effects are yielded.

(1) The information processing device 10A includes a security function related to information security, and an information processing function related to predetermined information processing. The information processing device 10A comprises a control unit 103A which performs control processing for realizing the security function and the information processing function, and a storage unit 104A which stores information related to the security function and the information processing function. When the control unit 103A detects an occurrence of a predetermined event related to the information processing function (step S1521), the control unit 103A determines an operation content of the security function based on the information stored in the storage unit 104A (step S1503). Consequently, it is possible to realize security measures of an information processing device which will not have an adverse effect on a running application or impose a high load on the CPU.

(2) The control unit 103A includes a security function control unit 401 which manages the security function, and an information processing function control unit 402 which manages the information processing function. The storage unit 104A stores an event operation management table 304 as operation management information with which an event related to the security function, a state of the information processing function and an operation content of the security function are associated. When the information processing function control unit 402 detects an occurrence of an event related to the information processing function (step S1521), the information processing function control unit 402 notifies the detected event to the security function control unit 401 (step S1522). The security function control unit 401 determines the operation content of the security function based on the event notified from the information processing function control unit 402 and the event operation management table 304 stored in the storage unit 104A. Subsequently, the security function control unit 401 manages the security function based on the determined operation content of the security function by implementing the event based on the operation content (step S1503). Consequently, it is possible to appropriately perform security measures of an information processing device according to the event that occurred.

(3) The operation content of the information processing function is additionally associated with the event operation management table 304. The security function control unit 401 determines the operation content of the information processing function based on the event notified from the information processing function control unit 402 and the event operation management table 304 stored in the storage unit 104A, and the notifies the determined operation content of the information processing function to the information processing function control unit 402 (step S1504). The information processing function control unit 402 manages the information processing function based on the operation content of the information processing function notified from the security function control unit 401 by implementing the event based on the operation content (step S1525). Consequently, it is possible to reduce the load of an information processing device upon performing security measures according to the event that occurred.

Third Embodiment

In the first embodiment, a case was explained where the information processing function control unit 402 determines the content of the security measures to be implemented by the security function control unit 401 when the security function control unit 401 detects an event and notifies the detected event to the information processing function control unit 402. Moreover, in the second embodiment, a case was explained where the security function control unit 401 determines the content of the processing to be implemented by the information processing function control unit 402 when the information processing function control unit 402 detects an event and notifies the detected event to the security function control unit 401. Meanwhile, in the third embodiment, a case is explained where, when the security function control unit 401 detects an event related to a certain security function, the content of the processing to be implemented by the security function control unit 401 is determined in relation to a security function separate from the certain security function.

In the third embodiment also, similar to the second embodiment, the configuration of the information processing system 1 and the information processing device 10A is the same as the configuration of the first embodiment shown in FIG. 1 and FIG. 2. Moreover, the data and programs stored in the storage unit 104A, and the functional block of the control unit 103A, are also the same as those of the first embodiment shown in FIG. 3 and FIG. 4. Furthermore, the contents of the security level management information 301, the security level definition information 302, the security level determination information 303, the system state information 311, and the information processing level definition information 312 are the same as those of the first embodiment shown in FIG. 5 to FIG. 7, FIG. 10 and FIG. 11. The contents of the information processing function usage information 313, the security function state notification unit 321, the information processing function state notification unit 322, the security function operation comprehension flag 323, and the waiting state identification flag 324 are also the same as those explained in the first embodiment. Thus, the explanation of the foregoing contents are omitted.

Meanwhile, in the third embodiment, the event operation management table 304 is stored in the storage unit 104A by including contents that are different from the first and second embodiments. Specifically, in the event operation management table 304 used in this embodiment, when an event related to a certain security function occurs, the contents of the operations (events) to be implemented by the security function control unit 401 related to a security function separate from the certain security function are defined.

FIG. 17 is an example of a table configuration of the event operation management table 304 in the third embodiment. The event operation management table 304 represents the event to be implemented by the security function control unit 401 related to another information processing function, the content to be notified from the security function control unit 401, and the event to be implemented by the security function control unit 401 after receiving the notified content for each detected event of the security function control unit 401 defined regarding the respective information processing functions, for instance, by taking on the table configuration as shown in FIG. 17. Note that FIG. 17 illustrates an example of the detected event operation management table 304 defined in relation to the virus detection/removal function 411 among the security functions managed by the security function control unit 401. While the other respective security functions; specifically, the access control function 412, the authentication function 413, and the encryption function 414 are not specifically illustrated, the event operation management table 304 is defined in the same manner as FIG. 17.

In the table of FIG. 17, among the events related to the virus detection/removal function 411, various events to be detected by the security function control unit 401 are defined as the detected events. The event to be implemented by the security function control unit 401 representing the operation content of the security function to be implemented in relation to another security function, such as the access control function 412, are mutually associated and defined for each detected event.

When the security function control unit 401 detects the occurrence of any detected event defined in FIG. 17, the security function control unit 401 notifies such effect to another security function to be managed by the security function control unit 401. Upon receiving the notice, the security function control unit 401 causes that security function to implement a predetermined operation (event) based on the definitions of FIG. 17.

<Processing Flow of Security Function Control Unit 401>

Figure 18:
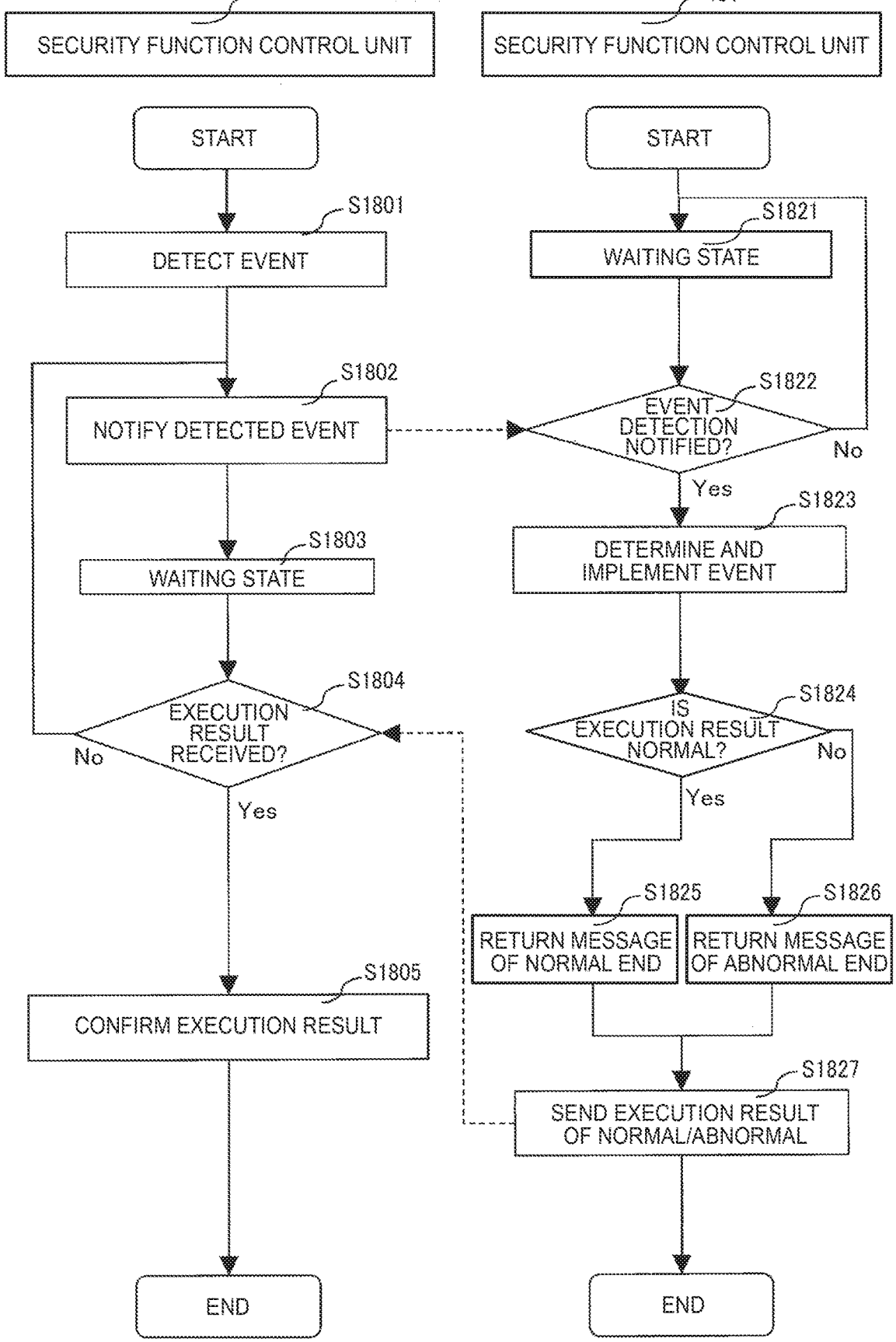
FIG. 18 is a flowchart of the security measure processing in the third embodiment.

The processing of the security function control unit 401 is now explained in detail. FIG. 18 is a flowchart of the security measure processing to be executed by the security function control unit 401 in the third embodiment of the present invention.

In step S1801, the security function control unit 401 detects an event that occurred in relation to any one of the security functions. Here, when an event defined in the event operation management table 304 illustrated in FIG. 17 occurs, the security function control unit 401 detects the occurrence of that event. In the ensuing explanation, the security function corresponding to the event detected in step S1801 is hereinafter referred to as the "detection side security function".

In step S1802, the security function control unit 401 notifies the event related to the event detection security function detected in step S1801 to another security function. Here, the detected event is notified within the security function control unit 401 by writing predetermined data in the security function state notification unit 321. In the ensuing explanation, the other event to be notified as an event detection in step S1802 is hereinafter referred to as the "notification destination side security function".

In step S1803, the security function control unit 401 enters a data reception waiting state for receiving data from the notification destination side security function.

In step S1821, the security function control unit 401 enters a data reception waiting state for receiving data from the detection side security function.

In step S1822, the security function control unit 401 determines whether an event detection notice has been received from the detection side security function. Here, whether an event detection notice has been received is determined based on whether or not data has been written in the security function state notification unit 321. Consequently, when data has been written in the security function state notification unit 321, the security function control unit 401 determines that a detected event has been notified from the detection side security function in step S1802, and then proceeds to step S1823. Meanwhile, when data has not been written into the security function state notification unit 321, the security function control unit 401 determines that an event detection notice from the detection side security function has not been received, and returns to step S1821.

In step S1823, the security function control unit 401 determines the event to be implemented by the notification destination side security function based on the detected event notified in step S1822 and the detected event notified stored in the storage unit 104A. Here, the security function control unit 401 determines the event to be implemented by the notification destination side security function corresponding to the detected event by referring to the event operation management table 304 as illustrated in FIG. 17. After determining the event to be implemented, the security function control unit 401 implements the event by using one of the security functions illustrated as the virus detection/removal function 411, the access control function 412, the authentication function 413, and the encryption function 414 in FIG. 4. The security function control unit 401 thereby manages the security function based on the notice from the detection side security function.

In step S1824, the security function control unit 401 determines whether the execution result of the event implemented in step S1823 is normal. The security function control unit 401 proceeds to step S1825 when the event execution result is normal as a result of the determination, and proceeds to step S1826 when the event execution result is abnormal.

In step S1825, the security function control unit 401 returns a message to the effect that the event implemented in step S1823 ended normally as the event execution result. After executing step S1825, the security function control unit 401 proceeds to step S1827.

In step S1826, the security function control unit 401 returns a message to the effect that the event implemented in step S1823 ended abnormally as the event execution result. After executing step S1826, the security function control unit 401 proceeds to step S1827.

In step S1827, the security function control unit 401 sends the event execution result obtained in step S1825 or step S1826 to the detection side security function. Here, similar to step S1802, the event execution result can be sent within the security function control unit 401 by writing predetermined data in the security function state notification unit 321.

In step S1804, the security function control unit 401 determines whether or not an event execution result has been received from the notification destination side security function. Here, the security function control unit 401 determines whether an event execution result has been received based on whether or not data has been written in the security function state notification unit 321. Consequently, the security function control unit 401 determines that an event execution result has been sent from the notification destination side security function in step 31827 when data has been written in the security function state notification unit 321, and then proceeds to step S1805. Meanwhile, the security function control unit 401 determines that an event execution result has not been sent from the notification destination side security function when data has not been written in the security function state notification unit 321, and returns to step S1802.

In step S1805, the security function control unit 401 confirms the event execution result received in step S1804. After executing the processing of step S1805, the security function control unit 401 ends the security measure processing shown in the flowchart of FIG. 18.

Specific examples of the processing of the security function control unit 401 are now explained with reference to FIG. 19. FIG. 19 is a flowchart showing a specific example of the security measure processing to be executed by the security function control unit 401 in the third embodiment of the present invention. FIG. 19 shows an example where the security function control unit 401 detects that there are one or more virus scan results as an event related to the virus detection/removal function 411.

Note that, in the flowchart of FIG. 19, the same step numbers as FIG. 18 are assigned to the respective processing steps corresponding to the flowchart of FIG. 18. In the ensuing explanation, the explanation of contents that are common with those previously explained in FIG. 18 is omitted.

In step S1801, the security function control unit 401 detects that there are one or more virus scan results.

In step S1802, the security function control unit 401 notifies the event detected in step S1801; that is, that there are one or more virus scan results, to the notification destination side security function. Here, the event detection shall be notified to the access control function 412 as the notification destination side security function.

In step S1822, the security function control unit 401 determines whether or not a notice to the effect that there are one or more virus scan results was received from the virus detection/removal function 411 as the detection side security function. The security function control unit 401 proceeds to step S1823 when data indicating that there are one or more virus scan results has been written in the security function state notification unit 321.

In step S1823, the security function control unit 401 refers to the event operation management table 304 illustrated in FIG. 17, and determines the event to be implemented by the access control function 412. Here, because the detected event is that there are one or more virus scan results, the security function control unit 401 determines that the event to be implemented by the access control function 412 is to prohibit the transmission of data to an external device via the wired communication unit 224 or the close-range wireless communication unit 223 of FIG. 2 based on the event operation management table 304 of FIG. 17. Accordingly, the security function control unit 401 prohibits the transmission of data to an external device by using the access control function 412.

In step S1824, the security function control unit 401 determines whether the transmission of data to an external device was properly prohibited in step S1823. Subsequently, in step S1827, the security function control unit 401 sends the event execution result of normal or abnormal obtained in step S1825 or S1826 to the virus detection/removal function 411.

<Effect of Security Measures in Third Embodiment>

According to the third embodiment explained above, it is possible to realize appropriate security measures. The reasons for this are as follows.

The event operation management table 304 illustrated in FIG. 17 is defined so that different security measures are implemented according to the implementation result of the initially implemented security measures. Thus, in the event operation management table 304, the event operation management table of FIG. 17 should be defined so that another security function is used to implement security measures which will not affect the external device when the information processing device 10A encounters a security attack against any one of the security functions. It is thereby possible to realize proper security measures.

According to the third embodiment of the present invention explained above, the following effects are yielded.

(1) The information processing device 10A includes a security function related to information security, and an information processing function related to predetermined information processing. The information processing device 10A comprises a control unit 103A which performs control processing for realizing the security function and the information processing function, and a storage unit 104A which stores information related to the security function and the information processing function. When the control unit 103A detects an occurrence of a predetermined event related to the security function (step S1801), the control unit 103A determines an operation content of the security function based on the information stored in the storage unit 104A (step S1823). Consequently, it is possible to realize security measures of an information processing device which will not have an adverse effect on a running application or impose a high load on the CPU.

(2) The control unit 103A includes a security function control unit 401 which manages a plurality of security functions including a virus detection/removal function 411 and an access control function 412, and an information processing function control unit 402 which manages the information processing function. The storage unit 104A stores an event operation management table 304 as operation management information with which an event related to the virus detection/removal function 411 and an operation content of the access control function 412 are associated. When the security function control unit 401 detects an occurrence of an event related to the virus detection/removal function 411 (step S1801), the security function control unit 401 determines the operation content of the access control function 412 based on the detected event and the event operation management table 304 stored in the storage unit 104A.

Subsequently, the security function control unit 401 manages the security function based on the determined operation content of the access control function 412 by implementing the event based on the operation content (step S1823). Consequently, it is possible to appropriately perform security measures of an information processing device according to the event that occurred.

Note that the embodiments and various types of modified examples explained above are merely illustrative, and the present invention is not limited to the subject matter of such embodiments and modified examples so as long as the features of the invention are not impaired. The present invention is not limited to the foregoing embodiments and modified examples, and may be variously modified to the extent that such modification does not deviate from the gist of the present invention.

The disclosure of the following priority application is incorporated herein by reference. Japanese Patent Application No. 2015-89717 (filed on Apr. 24, 2015)

REFERENCE SIGNS LIST

10A, 10B: information processing device, 101A, 101B: communication unit, 103A, 103B: control unit, 104A, 104B: storage unit, 105A, 105B: portable storage medium interface unit, 106A, 106B: sensor, 107A, 107B: I/O interface, 108A, 108B: display, 109A, 109B: input device, 110A, 110B: speaker, 30: communication network, 221: GPS reception unit, 222: VICS information reception unit, 223: close-range wireless communication unit, 224: wired communication unit, 225: vibrating structure gyroscope, 226: vehicle speed sensor, 301: security level management information, 302: security level definition information, 303: security level determination information, 304: event operation management table, 305: security level information, 311: system state information, 312: information processing level definition information, 313: information processing function usage information, 321: security function state notification unit, 322: information processing function state notification unit, 323: security function operation comprehension flag, 324: waiting state identification flag, 331: security function program, 332: information processing function program, 401: security function control unit, 402: information processing function control unit, 411: virus detection/removal function, 412: access control function, 413: authentication function, 414: encryption function, 421: first information processing function, 422: second information processing function, 423: third information processing function, 424: fourth information processing function

The invention claimed is:

1. An information processing device for managing a plurality of information security functions related to information security of a vehicle, and an information processing function related to predetermined information processing, comprising:
  a processor that is configured to perform control processing for realizing the plurality of information security functions including a virus detection/removal function and an encryption function, and configured to perform control processing for realizing the information processing function; and
  a storage unit that is communicatively coupled with the processor and that stores information related to the information security function and the information processing function, wherein:
  the processor is configured to manage the information security function, and manage the information processing function;
  the storage unit stores operation management information comprising one or more events related to the information security function, a state of the information processing function, and an operation content of the information security function comprising a plurality of security levels, each security level defining whether or not each of the virus detection/removal function and the encryption function is currently valid or invalid;
  the processor is configured to:
    detect an occurrence of the one or more events related to the information security function, including detection of one or more external devices currently connected to the information processing device,
    acquire a plurality of kinds of information related to a state of a system in which the information processing device is installed,
    determine the state of the information processing function based on a combination of the acquired plurality of kinds of information,
    determine which one of a plurality of security levels to set as a current security level according to a number of external devices determined to be connected to the information processing device, the determined state of the information processing function, and the operation management information stored in the storage unit,
    and
    manage the information security function based on the determined operation content of the information security function by setting the determined one security level as the current security level.

2. The information processing device according to claim 1, wherein:
  the information processing device is installed in the vehicle; and
  the processor is configured to acquire a plurality of sets of information related to a traveling state of the vehicle as the plurality of kinds of information.

3. The information processing device according to claim 2, wherein:
  the plurality of sets of information related to the traveling state of the vehicle include at least information related to a vehicle speed, information related to a traveling experience to a destination, and information related to a traveling location of the vehicle.

4. The information processing device according to claim 1, wherein:
  the storage unit includes a first data area for storing information to be used for notifying the event, and a second data area for storing information to be used for notifying the operation content of the information security function or an operation content of the information processing function; and
  the first data area and the second data area are each exclusively controlled.

5. The information processing device according to claim 1, wherein:
  the processor is configured to select a level for the acquired plurality of kinds of information among predetermined three or more levels and determine an information processing level representing the state of the information processing function based on the selected level.

6. The information processing device according to claim 1, wherein the information processing device is in the vehicle; and
  the processor is configured to perform control processing for realizing the virus detection/removal function by:
    determining to execute a virus scan based on the detection of the occurrence of the event; and
    detecting and removing a file or program stored in the storage unit based on the virus scan.

7. The information processing device according to claim 1, wherein the processor is configured to:
    determine whether the one or more external devices are wirelessly connected to the information processing device, and
    determine whether the one or more external devices are connected to the information processing device via a wired interface, and
    determine which one of a plurality of security levels to set as a current security level according to a number of external devices determined to be wirelessly connected to the information processing device and a number of external devices determined to be connected to the information processing device via a wired interface.

8. An information processing device for managing a plurality of information security functions related to information security of a vehicle, and an information processing function related to predetermined information processing, comprising:
  a processor that is configured to perform control processing for realizing the plurality of information security functions including a virus detection/removal function and an encryption function, and configured to perform control processing for realizing the information processing function; and
  a storage unit that is communicatively coupled with the processor and that stores information related to the information security function and the information processing function, wherein:
  the processor is configured to manage the information security function, and manage the information processing function;
  the storage unit stores operation management information comprising one or more events related to the information processing function, an operation content, of the information security function and an operation content of the information processing function comprising a plurality of security levels, each security level defining whether or not each of the virus detection/removal function and the encryption function is currently valid or invalid; and
  the processor is configured to:
    detect an occurrence of the one or more events related to the information processing function, including detection of one or more external devices currently connected to the information processing device, determine the operation content of the information security function based on the event, the occurrence of which is detected, and the operation management information stored in the storage unit, determine the operation content of the information processing function based on an operation result of the information security function according to the determined operation content of the information security function and the operation management information by determining which one of a plurality of security levels to set as a current security level according to a number of external devices determined to be connected to the information processing device, and manage the information processing function based on the determined operation content of the information processing function by setting the determined one security level as the current security level.

9. An information processing method to be performed by an information processing device for managing a plurality of information security functions related to information security of a vehicle, and an information processing function related to predetermined information processing, wherein:

the information processing device comprises:

a processor that is configured to perform control processing for realizing the plurality of information security functions including a virus detection/removal function and an encryption function, and configured to perform control processing for realizing the information processing function, and a storage unit that is communicatively coupled with the processor and that stores information related to the information security function and the information processing function;

the storage unit stores operation management information comprising one or more events related to the information security function, a state of the information processing function, and the operation content of the information security function comprising a plurality of security levels, each security level defining whether or not each of the virus detection/removal function and the encryption function is currently valid or invalid;

the processor is configured to:

detect an occurrence of the one or more events related to the information security function, including detection of one or more external devices currently connected to the information processing device, acquire a plurality of kinds of information related to a state of a system in which the information processing device is installed, determine the state of the information processing function based on a combination of the acquired plurality of kinds of information, determine which one of a plurality of security levels to set as a current security level according to a number of external devices determined to be connected to the information processing device, the determined state of the information processing function, and the operation management information stored in the storage unit, and manage the security function based on the determined operation content of the information security function by setting the determined one security level as the current security level.

10. The information processing method according to claim 9, wherein:

the information processing device is installed in a vehicle; and the processor is configured to acquire a plurality of sets of information related to a traveling state of the vehicle as the plurality of kinds of information.

11. The information processing method according to claim 10, wherein:

the plurality of sets of information related to the traveling state of the vehicle include at least information related to a vehicle speed, information related to a traveling experience to a destination, and information related to a traveling location of the vehicle.

12. The information processing method according to claim 9, wherein:

the storage unit includes a first data area for storing information to be used for notifying the event, and a second data area for storing information to be used for notifying the operation content of the information security function or an operation content of the information processing function; and the first data area and the second data area are each exclusively controlled.

13. An information processing method to be performed by an information processing device for managing a plurality of information security functions related to information security of a vehicle, and an information processing function related to predetermined information processing, wherein:

the information processing device comprises:

a processor that is configured to perform control processing for realizing the plurality of information security functions including a virus detection/removal function and an encryption function, and configured to perform control processing for realizing the information processing function, and a storage unit that is communicatively coupled with the processor and that stores information related to the information security function and the information processing function;

the storage unit stores operation management information comprising one or more events related to the information processing function, an operation content of the information security function and an operation content of the information processing function comprising a plurality of security levels, each security level defining whether or not each of the virus detection/removal function and the encryption function is currently valid or invalid;

the processor is configured to:

detect an occurrence of the one or more events related to the information processing function, including detection of one or more external devices currently connected to the information processing device, determine the operation content of the information security function based on the event, the occurrence of which is detected, and the operation management information stored in the storage unit, determine the operation content of the information processing function based on an operation result of the information security function according to the determined operation content of the information security function and the operation management information by determining which one of a plurality of security levels to set as a current security level according to a number of external devices determined to be connected to the information processing device, and manage the information processing function based on the determined operation content of the information processing function by setting the determined one security level as the current security level.

\* \* \* \* \*